(12) United States Patent
Crockett et al.

(10) Patent No.: US 7,798,388 B2
(45) Date of Patent: Sep. 21, 2010

(54) METHOD OF DIFFUSION BONDING A FLUID FLOW APPARATUS

(75) Inventors: Mark Crockett, Cupertino, CA (US); John W. Lane, San Jose, CA (US); Vincent Kirchhoff, Morgan Hill, CA (US); Marcel E. Josephson, San Jose, CA (US); Hong P. Gao, Austin, TX (US); Bhaswan Manjunath, Karanataka (IN)

(73) Assignee: Applied Materials, Inc., Santa Clara, CA (US)

( * ) Notice: Subject to any disclaimer, the term of this patent is extended or adjusted under 35 U.S.C. 154(b) by 105 days.

(21) Appl. No.: 11/756,248

(22) Filed: May 31, 2007

(65) Prior Publication Data
US 2008/0296351 A1    Dec. 4, 2008

(51) Int. Cl.
*B23K 20/00* (2006.01)
*B23K 31/02* (2006.01)
*B23K 1/20* (2006.01)
*B23K 1/19* (2006.01)

(52) U.S. Cl. .................. 228/193; 228/164; 228/205; 228/262.1; 228/262.4; 228/262.41

(58) Field of Classification Search ............... 228/193, 228/196, 197, 205, 206, 262.1, 262.3, 262.4, 228/262.41
See application file for complete search history.

(56) References Cited

U.S. PATENT DOCUMENTS

| | | | |
|---|---|---|---|
| 3,391,703 A | 7/1968 | Kay | 137/269 |
| 3,664,887 A | 5/1972 | Atkiss | 148/6.16 |
| 3,670,397 A * | 6/1972 | Lewis | 228/182 |
| 3,936,920 A * | 2/1976 | Conn, Jr. | 29/889.72 |
| 4,013,210 A * | 3/1977 | Deminet | 228/106 |
| 4,331,284 A * | 5/1982 | Schulz et al. | 228/157 |
| 4,570,675 A | 2/1986 | Fenwick et al. | 137/805 |
| 4,581,624 A | 4/1986 | O'Connor | 357/26 |
| 4,603,801 A | 8/1986 | Wan et al. | 228/194 |
| 4,691,856 A | 9/1987 | Haramaki et al. | 228/194 |
| 4,732,312 A * | 3/1988 | Kennedy et al. | 148/535 |
| 4,828,219 A | 5/1989 | Ohmi et al. | 251/118 |
| 4,934,580 A * | 6/1990 | Sutton | 228/157 |
| 5,070,607 A | 12/1991 | Boardman et al. | 29/890.042 |

(Continued)

FOREIGN PATENT DOCUMENTS

DE    112821 B    6/1980

(Continued)

OTHER PUBLICATIONS

ASTM A480/A480M-03B "Standard Specification for General Requirements for Flat-Rolled Stainless and Heat-Resisting Steel Plate, Sheet, and Strip". ASTM International. Jun. 2003.

(Continued)

*Primary Examiner*—Jessica L Ward
*Assistant Examiner*—Carlos Gamino
(74) *Attorney, Agent, or Firm*—Shirley L. Church

(57) ABSTRACT

The present invention relates to a method of diffusion bonding of steel and steel alloys, to fabricate a fluid delivery system of the kind which would be useful in semiconductor processing and in other applications which require high purity fluid handling.

11 Claims, 18 Drawing Sheets

U.S. PATENT DOCUMENTS

| | | | | |
|---|---|---|---|---|
| 5,083,371 | A * | 1/1992 | Leibfried et al. | 29/889.72 |
| 5,094,268 | A | 3/1992 | Morel et al. | 137/560 |
| 5,113,583 | A * | 5/1992 | Jenkel et al. | 29/889.21 |
| 5,205,465 | A * | 4/1993 | Bogard et al. | 228/119 |
| 5,226,578 | A | 7/1993 | Douglas | 228/157 |
| 5,253,796 | A | 10/1993 | Stacher et al. | 228/193 |
| 5,303,731 | A | 4/1994 | Vavra et al. | 137/468 |
| 5,385,204 | A | 1/1995 | Boardman et al. | 165/170 |
| 5,401,583 | A | 3/1995 | Stacher et al. | 428/594 |
| 5,423,123 | A | 6/1995 | McQuilkin et al. | 29/897.32 |
| 5,505,256 | A | 4/1996 | Boardman et al. | 165/166 |
| 5,516,593 | A * | 5/1996 | Weisse et al. | 428/586 |
| 5,587,074 | A * | 12/1996 | Lynch et al. | 210/411 |
| 5,605,179 | A | 2/1997 | Strong, Jr. et al. | 167/884 |
| 5,611,944 | A | 3/1997 | Gilkinson et al. | 219/117.1 |
| 5,686,657 | A | 11/1997 | Craig et al. | 73/23.42 |
| 5,730,181 | A | 3/1998 | Doyle et al. | 137/487.5 |
| 5,755,428 | A | 5/1998 | Ollivier | 251/331 |
| 5,836,355 | A | 11/1998 | Markulec et al. | 137/884 |
| 5,859,107 | A | 1/1999 | Jones et al. | 524/406 |
| 5,888,390 | A | 3/1999 | Craig | 210/198.2 |
| 5,935,430 | A | 8/1999 | Craig | 210/198.2 |
| 5,992,463 | A | 11/1999 | Redemann et al. | 137/884 |
| 5,997,708 | A | 12/1999 | Craig | 204/601 |
| 6,062,246 | A | 5/2000 | Tanaka et al. | 137/12 |
| 6,068,179 | A | 5/2000 | Fowler | 228/157 |
| 6,109,504 | A * | 8/2000 | Groll | 228/107 |
| 6,221,235 | B1 | 4/2001 | Gebhart | 205/654 |
| 6,251,779 | B1 | 6/2001 | Lu et al. | 438/682 |
| 6,305,418 | B1 | 10/2001 | Schulze | 137/625.23 |
| 6,357,760 | B1 | 3/2002 | Doyle | 277/604 |
| 6,457,236 | B1 | 10/2002 | White et al. | 29/890.08 |
| 6,503,126 | B1 * | 1/2003 | Rhoades | 451/36 |
| 6,510,894 | B1 | 1/2003 | Watton et al. | 165/166 |
| 6,736,370 | B1 | 5/2004 | Crockett et al. | 251/331 |
| 6,859,120 | B2 * | 2/2005 | Sweatt et al. | 335/78 |
| 6,880,745 | B2 * | 4/2005 | Stueber et al. | 228/194 |
| 6,921,470 | B2 * | 7/2005 | Michaluk | 204/298.13 |
| 6,962,834 | B2 * | 11/2005 | Stark | 438/107 |
| 7,033,553 | B2 | 4/2006 | Johnston et al. | 422/199 |
| 7,141,812 | B2 | 12/2006 | Appleby et al. | 250/505.1 |
| 7,448,276 | B2 * | 11/2008 | Crockett et al. | 73/718 |
| 7,559,527 | B2 * | 7/2009 | Crockett et al. | 251/63.5 |
| 2001/0028049 | A1 | 10/2001 | Mamyo | 251/63.5 |
| 2002/0003222 | A1 | 1/2002 | Fukano et al. | 251/63.5 |
| 2002/0013445 | A1 | 1/2002 | Nagai et al. | 137/884 |
| 2002/0018739 | A1 | 2/2002 | Johnston et al. | 422/198 |
| 2003/0038166 | A1 * | 2/2003 | Gasse | 228/247 |
| 2004/0119038 | A1 | 6/2004 | Crockett et al. | 251/63.5 |
| 2005/0017055 | A1 | 1/2005 | Kurz et al. | 228/194 |
| 2005/0161381 | A1 | 7/2005 | Norman | 210/198.2 |
| 2006/0039788 | A1 | 2/2006 | Arnold | 416/204 |
| 2007/0051080 | A1 | 3/2007 | Crockett et al. | 55/385.6 |
| 2007/0053829 | A1 | 3/2007 | Sethi et al. | 423/584 |

FOREIGN PATENT DOCUMENTS

| | | |
|---|---|---|
| DE | 19703169 | 7/1998 |
| EP | 0918178 | 5/1999 |
| EP | 0989605 A2 | 3/2000 |
| GB | 0743972 | 1/1956 |
| GB | 1279167 | 6/1972 |
| GB | 1440968 | 6/1976 |
| JP | 03013506 A | 1/1991 |
| JP | 8075017 | 3/1996 |
| JP | 11101352 | 4/1999 |
| JP | 11194833 | 7/1999 |
| WO | WO 01/14775 | 3/2001 |
| WO | WO 01/54806 | 8/2001 |

OTHER PUBLICATIONS

SEMI F20-0706$^E$ "Specification for 316L Stainless Steel Bar, Forgings, Extruded Shapes, Plate, and Tubing for Components used in General Purpose, High Purity and Ultra-High Purity Semiconductor Manufacturing Applications", Semiconductor Equipment and Materials International (2006).

V.A. Bubnov, "Calculation of flow rate characteristics for controlling the hydraulic drive of a machine tool," Soviet Engineering Research, vol. 10, No. 11, pp. 90-96 (1990).

D. Robinson et al., "Actuated Diaphragm Valves for Control Applications," Papers Presented at the International Conference on Developments in Valves & Actuators for Fluid Control, published by BHRA, Cranfield, England, pp. 97-117 (1985).

N. Sidell et al., "The design and construction of a high temperature linear electromagnetic actuator," Journal of Applied Physics, vol. 85, No. 8, pp. 4901-4903 (Apr. 1999).

International Search Report of corresponding PCT Application Serial No. PCT/US08/06901.

* cited by examiner

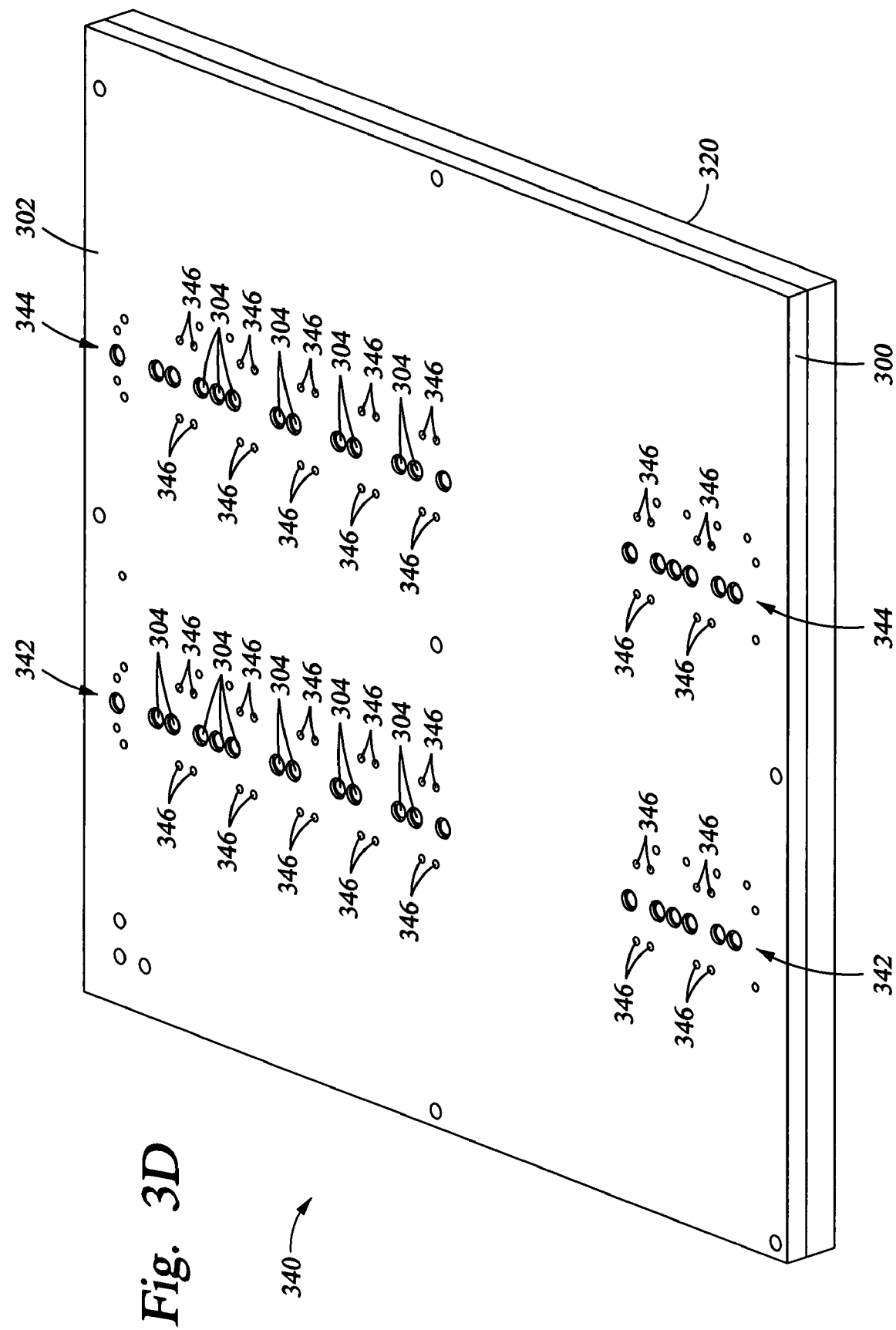

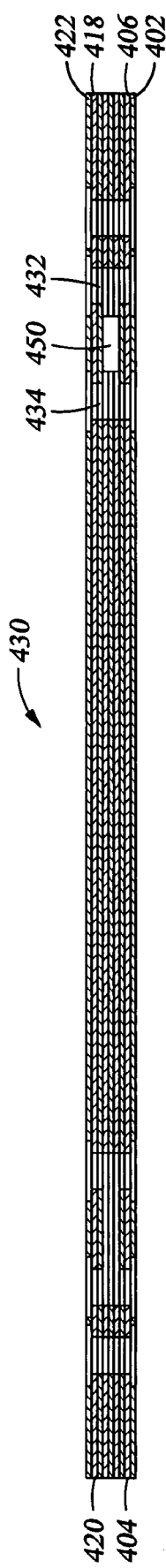
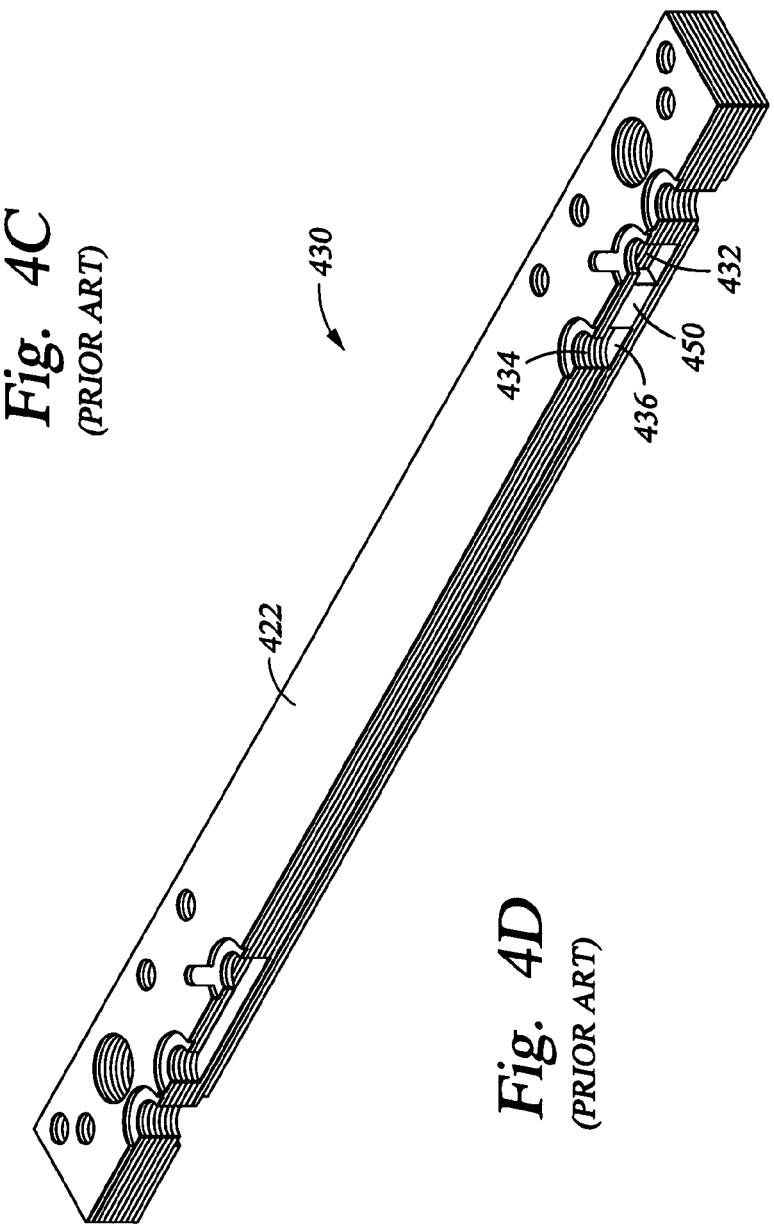
Fig. 4C (PRIOR ART)
Fig. 4D (PRIOR ART)

METHOD OF DIFFUSION BONDING A FLUID FLOW APPARATUS

RELATED APPLICATIONS

This application is related to subject matter discussed in U.S. Pat. No. 6,736,370, which issued May 18, 2004 to Mark Crockett et al.; U.S. patent application Ser. No. 10/617,950 of Crockett et al, filed Jul. 12, 2003, currently, which is a continuation-in-part application from the subject matter contained in U.S. Pat. No. 6,736,370; U.S. patent application Ser. No. 11/509,507, filed Aug. 23, 2006, currently pending, which is a divisional application of U.S. application Ser. No. 10/617,950; U.S. patent application Ser. No. 11/542,829, filed Oct. 3, 2006, currently pending, which is a divisional application of U.S. application Ser. No. 10/617,950; U.S. patent application Ser. No. 11/582,748, filed Oct. 17, 2006, currently pending, which is a divisional application of U.S. application Ser. No. 10/617,950; and U.S. patent application Ser. No. 11/586,103, filed Oct. 24, 2006, currently pending, which is a divisional application of U.S. application Ser. No. 10/617,950. The subject matter of each of these patents or applications is hereby incorporated by reference.

FIELD OF THE INVENTION

The present invention pertains to a method of producing a fluid delivery system which is particularly useful in semiconductor processing equipment, where the fluid delivery system often is exposed to corrosive environments. An identifying feature of the fluid delivery system is that at least a portion of the fluid delivery elements are diffusion bonded. The method can be used to produce a fluid delivery system which is useful in other industries as well, where the starting material which is used is selected for the particular end use application. The fluid delivery system may contain integrated fluid components, such as filters, pressure sensors, fluidic thermal sensors, laminar flow elements, pressure regulators, control valves, flow restrictors, and check valves, by way of example, which may be integrated to different degrees into the structure of the fluid delivery system network architecture.

BACKGROUND

This section describes background subject matter related to the disclosed embodiments of the present invention. There is no intention, either express or implied, that the background art discussed in this section legally constitutes prior art.

In chemical processing which relies on fluid handling in general, and particularly when the fluids to be handled are toxic, hazardous and potentially reactive with materials of construction or ambient air. Improved system leak reliability and careful integration of the fluid handling devices into a network architecture which makes up the fluid handling system is of paramount importance. In addition, it is important that all of the component devices used in the fluid handling be well integrated into the overall fluid flow network architecture, to ensure system leak reliability, provide a compact size, and enable flexible control. In applications such as semiconductor processing, for example, the fluid component devices must also exhibit particular capabilities which ensure cleanliness of the fluid delivery process, so that the solid state devices being fabricated will not be contaminated, affecting performance and reliability.

As discussed in related U.S. Pat. No. 6,736,370 to Crockett et al., issued May 18, 2004, and entitled: "Diaphragm Valve With Dynamic Metal Seat And Coned Disk Springs", to ensure that particles will not be generated by the fluid delivery apparatus, it is important that the interior surface of fluid flow channels be smooth, and without sharp corners which can wear down and act as a source of particulates. In addition, it is important that the material which forms the fluid flow channels not be corroded by a fluid which passes through the fluid flow channels, and that there not be dead space in the channels which would permit corrosion and act as a source of hazardous material when the fluid flow system is shut down for maintenance.

In semiconductor processing equipment, it is critical that the fluid flow system not leak; further, gases such as hydrogen and helium are commonly handled by the fluid delivery system. Hydrogen is the lightest element and is found in nature as a colorless, odorless, highly flammable gas in the molecular form $H_2$. Hydrogen leaking from a pinhole leak in a piping system can ignite and burns with a nearly invisible blue flame which is highly dangerous to someone walking by. Helium is also a light weight, small atom, which is typically used for leak testing because of its small atomic size, diffusivity and high mobility. While a leak of Helium is not as dangerous as a leak of hydrogen, the fluid flow system must be adequate to contain helium without a substantial leak. The general semiconductor industry standard for a helium leak is as little as about $1 \times 10^{-9}$ cc/sec. of helium at a pressure differential of one atmosphere. A fluid flow system which can meet this helium leak requirement is indicative of the ability to prevent exposure of the environment to often extremely toxic and corrosive process fluids. Due to the toxicity of a number of the fluids transported, very high system leak reliability and long service life (avoidance of the need to shut down and change out parts) are of great importance. Also of importance are a compact design, and a reasonable cost.

In related U.S. patent application Ser. No. 10/617,950 of Crockett et al., filed Jul. 12, 2003, entitled: "Micromachined Integrated Fluid Delivery System With Dynamic Metal Seat Valve And Other Components", general concepts are provided regarding an integrated fluid flow system with high levels of device integration which permits not only improved functionality, but also considerable cost savings in fabrication. As described in the '950 patent application, as a result of reduced fabrication cost, and a properly balanced level of modularity, it is possible to reduce maintenance costs for the fluid flow system by replacing integrated modules rather than shutting the system down for long maintenance and repair operations with respect to individual component devices (which are part of the integrated module in present designs).

With respect to an integrated network architecture of fluid flow devices and channels with an integrated control system, there is a constant need for a higher degree of integration, simplification and ease of operation. In addition to performance and handling advantages, the integrated fluid flow system must be cost competitive. This means that fabrication methods for the various fluid handling devices, interconnecting network architecture and integrated control system need to be easily scalable in tooling for mass production, variable production demand and cost-effective NRE (Non-recurring Engineering) charges. The present invention provides substantial advantages in all of these areas.

There are a number of U.S. patents which pertain to gas sticks of the kind which are frequently used in the semiconductor industry to transport fluids to and from semiconductor processing chambers and apparatus which is used in conjunction with the processing chambers. These gas sticks are typically fabricated from machined blocks of corrosion resistant material. Some examples of U.S. patents which pertain to gas sticks include: U.S. Pat. No. 5,303,731, issued Apr. 19, 1994, entitled "Liquid Flow Controller", which describes the body block of a fluid flow controller which has conduits machined in it. U.S. Pat. No. 5,605,179, issued Feb. 25, 1997, entitled "Integrated Gas Panel", which describes a plurality of individual gas process modules coupled together with a plurality of gaskets located between them; where the modules are coupled together such that respective ports of each module are in fluid communication with one another to form a common tube or port. U.S. Pat. No. 5,730,181, issued Mar. 24, 1998, entitled "Mass Flow Controller with Vertical Purifier", which describes a purifier which includes a purifier metal block, a mass flow meter block, and a valve block, where sealing between the blocks is with a "z" seal, and each block has machined fluid flow conduits in it. U.S. Pat. No. 5,836,355, issued Nov. 17, 1998, entitled "Building Blocks for Integrated Gas Panel", which describes a gas panel comprising a plurality of discreet blocks, where gas tubing is replaced by stacked blocks which have a series of conduits oriented at different directions which are designed to be used with other blocks to form a fluid pathway. U.S. Pat. No. 5,992,463, issued Nov. 30, 1999, entitled "Gas Panel", which describes a one piece manifold body which has at least one lateral wall extending in the general direction of gas flow. The lateral wall includes at least one active device site (to which an active device is attached) having an active device thereon (a series of openings and conduits are machined into the manifold).

These gas sticks typically include components and manifolds which are fabricated from machined blocks of corrosion resistant material. Gas sticks of this kind are costly to fabricate, and frequently the machined manifolds are a source of particulates which are generated as fluids flow over a rough surface or around elbow corners which are created by the machining process.

Axially loaded diffusion bonding techniques have been developed for use in the manufacture of heat exchangers; gas turbine engine aerofoils such as fan blades, and compressor blades; and, separation column devices for use in gas or liquid phase sample analysis, for example. The technique used for axially-loaded diffusion bonding is very closely related to the device which is being fabricated. The diffusion bonding conditions depend on the materials to be diffusion bonded, the complexity of the shape of the device which is being fabricated, and the performance criteria for the diffusion bonded device. Due to the difficulty in obtaining a uniformly diffusion bonded article, other means of holding elements of a device together, such as brazing or application of an adhesive, for example, are used when the application will permit.

In addition to axially-loaded diffusion bonding, another form of diffusion bonding may be used to produce laminated parts. Hot Isotactic Pressing (HIP) is said to be particularly suited for the bonding of dissimilar materials. Dissimilar materials such as silicon nitride, Incoloy 909, austenitic steel, ferritic steel, zirconia, and zirconia-hydroxyapatite are said to have been bonded using HIP techniques. A series of published papers is available with respect to the joining of cemented carbides of the kind using for tooling applications. A HIP diffusion bonding technique is sometimes recommended as an alternative to axially-loaded diffusion bonding. However, the HIP diffusion bonding (an iso-static loaded technique) requires different, more complex fixturing. Both processes fall under the broad category of diffusion bonding.

Diffusion bonding techniques commonly use interlayers to ensure good contact between the bonding surfaces and that bond strengths close to the bulk strength of the material are obtained in the bonding process. At the same time, interlayers are not recommended in cases where high tolerances are required by the component design The present invention is related to diffusion bonded substrates which include fluid flow conduits. These fluid flow conduits preferably are formed from etched plates which are designed, when combined, to produce complex shaped fluid flow conduits when necessary, and to produce rounded surfaces when a conduit turns or twists to accommodate devices which are mounted on or contained within the substrate. The diffusion bonded substrates provide the advantage of reduced dead space and generation of fewer particulates; however, the diffusion bonding process requires careful control of process materials and processing conditions to produce an acceptable bonded part.

A detailed review of the documents discussed above and other publications and patents which describe diffusion bonding as a fabrication technique for particular devices makes it clear that the fabrication method used depends considerably on the design of the device which is required to perform the device function, and on the materials from which the device is constructed. In the present instance, the device may be any fluid flow device which is used as a part of semiconductor fabrication equipment.

SUMMARY

The present invention relates to a method of diffusion bonding of steel and steel alloys, to fabricate a fluid delivery system. While the method can be used to bond steel and steel alloy parts in general, one of the most stringent sets of requirements for a diffusion bonded fluid delivery part is found in the semiconductor processing industry, due to the corrosive and toxic nature of fluids which are commonly handled in that industry. One of the more important fluid flow devices used in semiconductor fluid delivery systems is the gas stick which supplies process gases to a semiconductor processing chamber. For purposes of illustration, the invention is described in terms of gas stick fabrication, but one skilled in the art, upon reading the present disclosure, will contemplate a number of other fluid flow devices useful in semiconductor fabrication, and other industries where ultra high purity is required, where devices may be fabricated using the teachings of the present invention.

In a typical embodiment, the method of diffusion bonding makes use of a plurality of sheets of stainless steel or stainless steel alloy, to form a fluid flow handling structure which performs as required. The diffusion bonding method requires a number of specific steps to ensure that the diffusion bonded fluid flow handing structure will provide corrosion resistance and high leak integrity of the kind required in semiconductor processing equipment, for example. Included in the method steps are the following operations:

selecting a sheet which is to be diffusion bonded to form a fluid flow handling structure, where the sheet exhibits a chemical composition and structure which will provide an appropriate balance of mechanical strength, chemical compatibility, corrosion resistance and high leak integrity with respect to the fluids which are to flow in the fluid handling structure;

pattern etching or pattern machining the sheet to produce a depression in said sheet surface, or a through hole, or combinations thereof;

electropolishing or abrasive flow machining at least in an area of etched patterning or machine patterning;

finely grinding or lapping a bonding surface or bonding surfaces of said sheet to provide a surface roughness ranging from about 0.5 micro-inches Ra to about 35 micro-inches Ra;

aligning the plurality of sheets relative to each other in a manner which produces a desired fluid flow handling structure; and subjecting the plurality of sheets to a pressure sufficient to cause a crush ranging between about 0.75% and about 3% as measured when using uni-axial diffusion bonding, where the plurality of sheets have a bonding surface roughness ranging from about 0.5 micro-inches Ra to about 35 micro-inches Ra and are processed at a temperature ranging from about 900° C. to about 1075° C., and at a pressure ranging from about 1000 psi to about 7000 psi, for a time period ranging from about 1 hour to about 8 hours. When the sheets are bonded at a temperature of about 1075° C., the bulk material grain size within the sheets is about 0.5 when tested in accordance with ASTM E-112-96 (2004); this is equivalent to 302 micro meters average diameter. The grain size along the bond line was about 8.5 in accordance with the same test method; this is equivalent to 18.9 micro meters average diameter. Testing of the tensile strength of sheets bonded using this diffusion bonding technique, with bonding line being at the center of the necked portion of the test coupon, provided the following mechanical properties for the bonded samples: The peak load in pounds averaged 13,100, the tensile strength in psi averaged 75,200, the 0.2% offset yield strength is psi averaged 29,600, and the elongation percent at break averaged 75. These properties are indicative of an acceptable part in terms of mechanical strength.

Typically, when uni-axial bonding is used to diffusion bond stainless steel or stainless steel alloys, the surface roughness of the bonding surfaces ranges from about 1 micro-inch Ra to about 16 micro-inches Ra, and the sheets are processed at a temperature ranging from about 900° C. to about 1000° C., and at a pressure ranging from about 1000 psi to 5000 psi, for a time period ranging from about 2 hours to about 6 hours. More typically, the surface roughness of the bonding surfaces ranges from about 2 micro-inches Ra to about 10 micro-inches Ra, and the sheets are processed at a temperature ranging from about 950° C. to about 985° C., and a pressure ranging from 3000 psi to 3500 psi, for a time period ranging from about 3 hours to about 4 hours.

The kinds of steel and steel alloys which can be used depends on the end use application for the fluid delivery system. Some of the representative steel and steel alloys which have been shown to be particularly useful include Stainless steel 316L (or UNS S31603), stainless steel 317L (or UNS S31703), stainless steel 317 LN (or UNS S31726), Avesta® 254SMO (or UNS S31254), Avesta® A16XN (or N08367), Duplex® 2205 (or UNS S32205), and Duplex® 2507 (or UNS R30003), by way of example, and not by way of limitation. However, it is important to mention that, to the best of our knowledge, none of these materials can be used directly as they are produced at the mill. It is necessary to specialty process these materials if they are to be used for diffusion bonding without the use of an interfacial layer between the bonding layers. This specialty processing may be carried out at a mill, or at a grinding or polishing shop, at the request of the buyer of the sheet stock to be used to fabricate the fluid flow handling device.

Stainless steel 316L may be required to conform to the SEMI-F20 specification with respect to chemical composition, mechanical requirements, grain size, inclusion ratings, and screening for corrosion resistance. For fluid delivery applications, we have determined that compliance with these particular elements of the SEMI-F20 specification ensure success in bonding at minimal cost in terms of subsequent processing. This application of specialty processing/selection has been demonstrated with respect to only the 316 L stainless steel and not to the other alloys or steels listed above.

With respect to the other stainless steels discussed above, for the more demanding applications, it is recommended that these stainless steels be processed/selected to comply with the same SEMI-F20 specifications discussed above with respect to stainless steel 316L. Further, depending on the application, it may be advisable that the bonded part conform to a critical pitting temperature value that is greater than 10° C. as tested per SEMI F77, and a critical crevice temperature at interface of ≧0±1° C. measured per ASTM G-48 F (with a sample prepared with a cross section tilted by 13°).

With respect to all of the stainless steels discussed above, the grain size along the bonding line is recommended to be in the range of about 5 (63.5 micro meters average diameter) or finer per ASTM E112. The recommended inclusion requirement of ASTM E45 at the billet stage: type A inclusions thin=1.5 or less and heavy=1.0 or less; type B inclusions thin=1.0 or less and heavy=1.0 or less; type C inclusions thin=1.0 or less and heavy=1.0 or less; and type D inclusions thin=1.5 or less and heavy=1.0 or less. The mechanical requirements for ASTM-240 are recommended as well. When the application is for a highly corrosive environment, the material should meet the intergranular corrosion requirements per Practice # of ASTM A262.

The mating surface or surfaces of the steel or steel alloy which is/are to be diffusion bonded must be processed to provide a surface roughness which is less than 35 Ra micro-inches. Typically the surface roughness ranges between about 3 Ra micro-inches and about 10 Ra micro-inches, and more typically, the surface roughness ranges between about 5 Ra micro-inches and 10 Ra micro-inches.

While it is necessary to polish only the bonding surfaces of the sheets to obtain diffusion bonding of the sheets which make up the fluid flow component being fabricated, a part of the overall process of obtaining the desired surface roughness on mating surfaces to be diffusion bonded may include an electropolishing process (or mechanical polishing which provides equivalent results), which polishes patterned channel surfaces and through hole surfaces as well as the major surface of the sheet to be bonded. Polishing of these surfaces is helpful in reducing particulates which may be generated by fluid flow over these surfaces after the fluid flow device (component) is placed in use. A detailed description of the methods used to obtain the sheet surface roughness of 10 micro-inches Ra or less is described in the Detailed Description of Various Embodiments which is presented subsequently herein.

In addition to the surface finish, to obtain good diffusion bonding, the flatness of sheets to be bonded should be ±0.001 inches overall and ±0.0005 inches over any 4 square inch area. For the uni-axially loaded diffusion bonding method, the parallelism of the sheet should be ±0.001 inches overall and ±0.0005 inches over any 4 inch square area in an unrestrained condition, where unrestrained indicates the part not being physically limited in movement due to clamping or other restraining method. Also, for uni-axial loading, the thickness tolerance of the sheet should be ±0.0005 inches if stop blocks and stacking are used. Once the surface finish on the sheets has been completed, deburring at a diffusion bonding internal edge needs to be 0.005 inch maximum radius.

In addition to the surface roughness, the cleanliness of the mating surface to be diffusion bonded must be carefully controlled. Oxidation on the mating surfaces is particularly harmful. The stainless steel sheets to be diffusion bonded are typically cleaned using an 11 step process, and often includes a $12^{th}$ step for removal of the natural oxidation layer which tends to form on the surface of the sheets under ambient conditions. The following cleaning steps are performed: 1) Soaking of the sheets in an alkaline degreaser. An example of such a degreaser would be Enbond Q527™ or an equivalent in terms of functionality. 2) Dragging the sheets through a spray or immersion bath of ≧200K Ohm-cm water at ambient temperature. 3) Immersing the sheets in an acid etching solution for 2 minutes, where the acid etching solution consists of HF at 1% by volume-5% by volume, $HNO_3$ at 15% by volume-25% by volume, and DI (deionized) water as the remainder of the volume %. 4) Dragging the sheets through a spray or immersion bath of ≧200K Ohm-cm water at ambient temperature. 5) Power spraying the sheets at room temperature with ≧4M Ohm-cm water for a time period of 0.5 minutes to 4 minutes. 6) Immersing the sheets in an acid cleaning solution for about 2 to about 15 minutes, where the acid cleaning solution consists of $HNO_3$ at 40% by volume-60% by volume, with DI water as the remainder of the volume %. 7) Dragging the sheets through a spray or immersion bath of ≧200K Ohm-cm water at ambient temperature. 8) Power spraying the sheets at room temperature with ≧4M Ohm-cm water for a time period of 0.5 minutes to 4 minutes. 9) Immersing the sheets in 2M Ohm-cm water for a time period of 10 minutes to 30 minutes. Immersing the sheets in 4M Ohm-cm water for a time period of 10 minutes to 30 minutes. And, 11) Examining the sheets under a black light for loose particulates. If the concentration of particulates does not meet the empirically determined allowable level for the particular diffusion bonding process, the cleaning process may need to be repeated. In most instances, due to the natural oxidation of the cleaned surface upon exposure to ambient oxygen, it is advisable to perform an additional step: 12) Use of laser ablation or other kinetic process such as electron bombardment or ion sputtering to remove native oxide. It is recommended that this laser ablation be carried out under an inert gas and that the environment of the diffusion bonding processing also be an inert gas environment until such time as all of the sheets are stacked and tac welded in place, to prevent oxidation of the bonding surfaces prior to the diffusion bonding process.

Cleanliness quality may be measured for trace ionic contaminants. The following cation species are measured by ion chromatography: Al, Sb, As, Ba, Be, Bi, B, Cd, Ca, Cr, Co, Cu, Ga, Ge, Au, Fe, Pb, Li, Mg, Mn, Mo, Ni, Nb, K, Ag, Na, Sr, Ta, Tl, Sn, Ti, V, Zn, Zr, and $NH_{4+}$. The following anion species are measured by ICPMS (Inductively Coupled Plasma Mass Spectrometry): ($F^-$), ($Cl^-$), ($NO_2^-$), ($Br^-$), ($NO_3$)$^-$, ($SO_4$)$^-$, and ($PO_4$)$^{-3}$. The mass sum of anions and cations yields the total ionic contamination expressed in micrograms per unit area, and can be measured consistent with SEMASPEC 90120399B-STD. We have determined that a surface cleanliness of total ionic contamination of less than 0.33 micrograms per square inch is suitable for high quality bonding.

Natural passivated oxides (that is chrome oxides and iron oxides and other metal oxides created from ambient oxygen) which form a layer having a thickness greater than about 10 Å, measured in the manner described in SEMI F72, are not acceptable on sheets if a high quality bonding is to be achieved. For uniaxial diffusion bonding, when it is not possible to stack the parts in the presence of a non-oxidizing atmosphere, it is important to begin stacking the sheets immediately after removal of the oxides, and to begin the diffusion bonding process as soon as possible. For diffusion bonding using the HIP bonding technique, it is important to perform the vacuum perimeter welding as soon as possible after cleaning, and preferably to perform the welding within an inert environment until the vacuum is applied. A vacuum of $10^{-6}$ Torr is advisable when possible, to remove oxygen from the bonding regions. In the event that a vacuum is not available during the initial part of a HIP bonding process, it may be permissible to let any trapped air diffuse through the metal and outgas into the HIP vessel during the HIP cycle. However, whether particular environmental conditions are tolerable will need to be determined experimentally initially. If sheets must be stored after cleaning and before diffusion bonding, the sheets need to be packaged in bags which are pressure filled with inert gas to protect the bonding surface until use.

When using uni-axial loading diffusion bonding, it is important to design the sheets/plates to be diffusion bonded so that the change in dimensions which occurs during the diffusion bonding process is accounted for in the patterning of the sheets. One of skill in the art, in view of the processing conditions to be applied during bonding of the sheets, can calculate what the expected movement of patterns within individual sheets should be, and can adjust the pattern dimensions within the sheet to compensate appropriately. For example, assuming a uniform expansion and a 3% crush over the full interval of bonding time, the dimensional changes expected can be estimated. Crush is discussed subsequently herein.

The sheets of material to be diffusion bonded need to be aligned and held in place during the diffusion bonding process. In the embodiments described subsequently herein, the sheets were held in place using alignment pins during tac welding around the exterior of the sheets.

The pressure, temperature, and time conditions used during uni-axial loaded diffusion bonding of the sheets is designed to achieve a certain amount of crush. Where crush is defined as the % reduction in thickness of the combined sheets. Crush is an important quantity to manage, to enhance the bond quality under a given fixed pressure. Typically the amount of crush designed into diffusion bonding by the present method ranges from about 0.75% to about 3.5%.

Void density at the interface of diffusion bonded layers is also important. Void density is a measure of the amount of voids observed at the interface of bonded layers when a cross section of the bonding article is examined. We have determined that a high quality bond obtained using a crush between about 1.5% and 3.0% in the uniaxial loading diffusion bonding method described herein will produce less than 10% void density, where the void is measured looking at a cross section of the bonded layers at a magnification of 100×, and the void density is a summation of the length of breaks in the total length of a line traveling the length of the interface, divided by the total length of the interface within the field of view, times 100.

Inlet and outlet ports of a diffusion-bonded fluid flow manifold (of the kind used in a gas stick, for example), can be designed to be backward compatible with existing modular units of the kind presently used in the art. Further, sealing mechanisms needed to enable attachment of functional fluid flow devices on a surface of the diffusion-bonded fluid flow manifold can be designed to interface with such functional fluid flow devices.

BRIEF DESCRIPTION OF THE DRAWINGS

FIG. 2A shows through holes in the top sheet, which is applicable to uniaxial diffusion bonding, but not to diffusion bonding using a HIP bonding technique.

FIG. 3D shows the diffusion bonded assembly of the top and bottom sheets of material into a bonded substrate from which two gas stick substrates can be cut. This figure also shows the additional machining which has been done to the top sheet surface to provide sealing interfaces and attachment bores for devices which are to be attached to the top of each gas stick. Also shown are other blank (unmachined regions) where further test patterns (coupons) will be generated.

FIG. 4C is a schematic showing the cross-sectional view A-A of layered structure 430 including a fully integrated particulates in-line filter 450.

FIG. 4D is a schematic showing a more three-dimensional three quarter view of layered structure 430 and illustrating the inlet 432 and outlet 434 for in-line filter 450.

DETAILED DESCRIPTION OF VARIOUS EMBODIMENTS

Figure 1A:
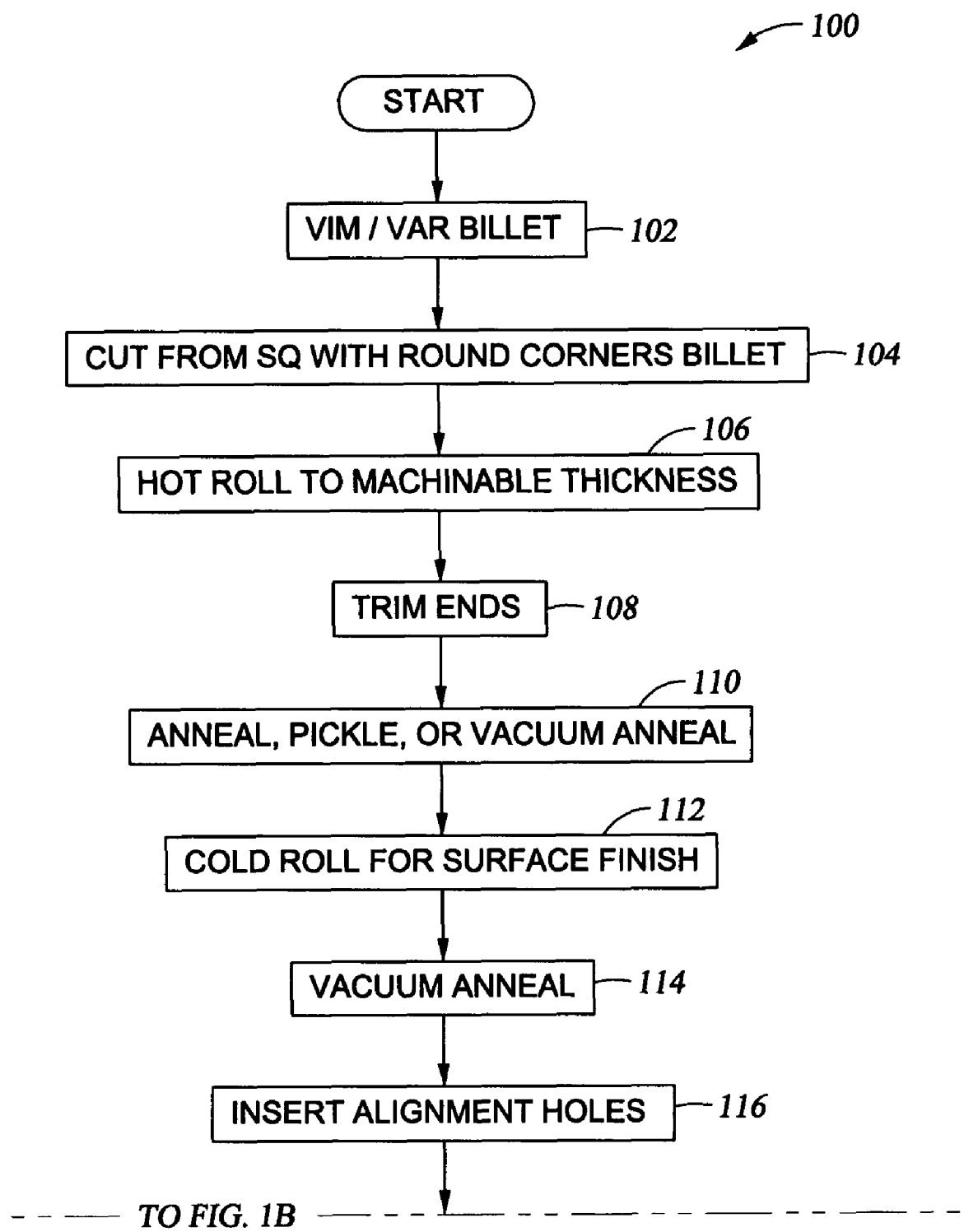
FIG. 1A is the first page of a process flow diagram showing basic steps which may be used for the preparation of a diffusion bonded fluid flow channel, such as a gas stick, by way of example and not by way of limitation.

As a preface to the detailed description, it should be noted that, as used in this specification and the appended claims, the singular forms "a", "an", and "the" include plural referents, unless the context clearly dictates otherwise. When the term metal or metallic is used, it is understood that this includes metal alloys. Other terms important to an understanding of the invention are defined in context throughout the application.

When the word "about" is used herein, this is intended to mean that the nominal value being expressed is accurate to within ±10%.

The present invention pertains to a diffusion bonded, space-conserving integrated fluid delivery system which is particularly useful for gas distribution in semiconductor processing equipment. The diffusion bonded fluid delivery system may include integrated devices, including filters and purifiers, pressure sensors, pressure regulators, fluidic thermal sensors, laminar flow elements, on/off valves, mass flow controllers, and check valves, by way of example and not by way of limitation. The integrated fluid handling devices may be in line in the diffusion bonded integrated fluid delivery system; or, the fluid handling devices may be surface mounted on a diffusion bonded manifold which contains a number of fluid flow channels; or, the fluid handling devices and fluid delivery system may include a combination of modular units which are attached in various orders to provide particular functionality. Whatever the design, the present invention comprises a plurality of layers which are diffusion bonded to produce a leak tight bond between the diffusion bonded layers.

The layers which are used to form the layered structure are patterned layers, where a first portion of a pattern may pass all the way through a layer while a second portion of the pattern is present to a nominal depth within the layer, but does not pass all the way through the layer. In some instances, all of the pattern may pass all the way through a layer, while in other instances all of the pattern may be present to a nominal depth within the layer.

Portions of component device structures and in some instances complete device structures are fabricated using patterned steel and steel alloy layers which are adhered using diffusion bonding. Preferably, but not necessarily (depending on the design), a component device or portion of the component device which is integrated into the general fluid handling structure is diffusion bonded simultaneously with the general fluid handling structure (typically a manifold). An integrated fluid delivery network architecture typically includes an assembly employing at least one gas distribution channel, where the assembly comprises a structure which employs a plurality (i.e., at least two) of metal layers (typically sheets) which have been diffusion bonded together. The metal layers are typically fabricated from austenitic stainless steels selected from the group consisting of stainless steel 316 (or UNS S31600), stainless steel 316L (or UNS S31603), stainless steel 317L (or UNS S31703), stainless steel 317 LN (or UNS S31726), Avesta® 254SMO (or UNS S31254), Avesta®A16XN (or N08367), austenitic-ferritic Duplex® 2205 (or UNS S32205), and Duplex® 2507 (or UNS S32750). The metal layers (sheets) may also be fabricated from solid solution strengthened Iconel® 625 (or UNS N06625), Hastelloy® C22 (or UNS N06022), Elgiloy® (or UNS R30003) and other steel-comprising materials which are essentially equivalent to these materials, as well as combinations thereof, by way of example. By essentially equivalent, it is intended to mean that the process conditions described herein can be used to diffusion bond the steel-comprising material when the bonding temperature and pressure are adjusted to achieve a resultant interfacial void density of 10% or less, on a cross sectional view of the interface at 100% magnification.

The Avesta® 254SMO (or UNS S31254) and Avesta® A16XN (or UNS N08367) are austentic stainless steels which, due to their high molybednum content possesses very high resistance to pitting and crevice corrosion. Duplex® 2205 (or UNS S32205) is the most widely used ferritic/austinic stainless steel grade. It finds applications due to both excellent corrosion resistance and high strength. The Duplex® 2507 (or UNS32750) is a super duplex stainless steel with a high chromium, molybdenum and nickel content which is designed for applications which require high strength and corrosion resistance. The steel has excellent resistance to chloride stress corrosion cracking and a low coefficient of thermal expansion. Iconel® 625 (or UNS N06625) and Hastelloy® C22 (or N06022) are well known for high strength and superior corrosion resistance. Elgiloy® (or UNS R30003) has excellent corrosion resistance and fatigue stress properties. All of these steels can be diffusion bonded using the methods described herein. Table I below shows composition data for Stainless 316, Stainless 316L, Stainless 327, Stainless 317L, Stainless 317 LN, Avesta® 254SMO, Avesta®A16XN, Duplex® 2205, and Duplex® 2507. One skilled in the art will be able to select similar materials which can be used in the applications described herein.

TABLE 1

Critical Element Content Of Corrosion-Resistant, Diffusion-Bondable Steel-Comprising Materials: Fe is the balance elemental content.

| Steel | C % | Mn % | Ni % | S % | Si % | Cr % | Mo % | P % | N % | Cu % |
|---|---|---|---|---|---|---|---|---|---|---|
| 316 UNS 31600 | 0.08 max | 2.00 max | 10.00 to 14.00 | 0.030 max | 1.00 max | 16.00 to 18.00 | 2.00 to 3.00 | 0.045 max | — | — |
| 316L UNS 31603 | 0.030 max | 2.00 max | 10.00 to 14.00 | 0.030 max | 1.00 max | 16.00 to 18.00 | 2.00 to 3.00 | 0.045 max | — | — |
| 316L SEMI F20 | 0.030 max | 1.5 max | 11.00 to 14.00 | 0.010 max | 0.75 max | 16.00 to 18.00 | 2.00 to 3.00 | 0.045 max | 0.10 max | — |
| 317 UNS S31700 | 0.08 max | 2.00 max | 11.00 to 15.00 | 0.030 max | 1.00 max | 18.00 to 20.00 | 3.00 to 4.00 | 0.045 max | — | — |
| 317L UNS S31703 | 0.03 max | 2.00 max | 11.00 to 15.00 | 0.030 max | 1.00 max | 18.00 to 20.00 | 3.00 to 4.00 | 0.045 max | — | — |
| 317LN UNS S31753 | 0.03 max | 2.00 max | 11.0 to 15.0 | 0.30 max | 1.00 max | 18.00 to 20.00 | 3.00 to 4.00 | 0.045 max | 0.10 to 0.22 | — |
| 254SMO UNS S31254 | 0.02 max | 1.00 max | 17.50 to 18.50 | 0.01 max | 0.80 max | 19.50 to 20.50 | 6.00 to 6.50 | 0.03 max | 0.18 to 0.22 | 0.50 to 1.00 |
| A16XN UNS N08367 | 0.030 max | 2.00 max | 23.50 to 25.50 | 0.030 max | 1.00 max | 20.0 to 22.0 | 6.00 to 7.00 | 0.040 max | 0.18 to 0.25 | — |
| Duplex ® 2205 UNS S32205 | 0.030 max | 2.0 max | 4.5 to 6.5 | 0.020 max | 1.00 max | 22.0 to 23.0 | 3.0 to 3.5 | 0.03 max | 0.14 to 0.20 | — |
| Duplex ® | 0.030 | 1.20 | 6.0 | 0.020 | 0.80 | 24.0 | 3.0 | 0.035 | 0.24 | — |

TABLE 1-continued

Critical Element Content Of Corrosion-Resistant, Diffusion-Bondable Steel-Comprising Materials: Fe is the balance elemental content.

| Steel | C % | Mn % | Ni % | S % | Si % | Cr % | Mo % | P % | N % | Cu % |
|---|---|---|---|---|---|---|---|---|---|---|
| 2507 UNS S32750 | max | max | to 8.0 | max | max | to 26.0 | to 5.0 | max | to 0.32 | |
| Recommended | 0.010 max | 0.4 max | 10.0 to 15.0 | 0.004 max | 0.40 max | 17.4 to 18.0 | 2.5 to 3.0 | 0.020 max | 0.10 max | — |

In each of the steel formulations provided above, the largest component (typically the remainder of material) is iron (Fe), which is the balance of the % by weight of the composition. All of the percentages recited are weight percentages.

While any of the formulations provided above may be used, the recommended formulation provides improved results, as: a lower content of manganese, silicon, or sulfur helps to minimize inclusions; and, a higher chromium and molybdenum content provide improved corrosion resistance.

Other constituents which may be present in a steel-comprising material, and upon which maximum limits have been placed by SEMI F20, for use in semiconductor production apparatus, include: a copper maximum content of 0.30%, a niobium maximum content of 0.05%, an aluminum maximum content of 0.01%, a calcium maximum content of 0.02%; a titanium maximum content of 0.02%, and a selenium maximum content of 0.02%. The material conforming to the SEMI-F20 specification with respect to sulfur content and copper content is particularly helpful for semiconductor device fabrication applications. For diffusion bonding applications, we have determined that a low carbon content, e.g. $\leq 0.010\%$ by weight is important to prevent sensitization, discussed below, during long cooling cycles. It is also important to prevent carbon support structures from coming into contact with the stainless steel where it can increase the concentration of carbon during a high temperature bonding process and affect susceptibility to corrosion.

Figure 6:
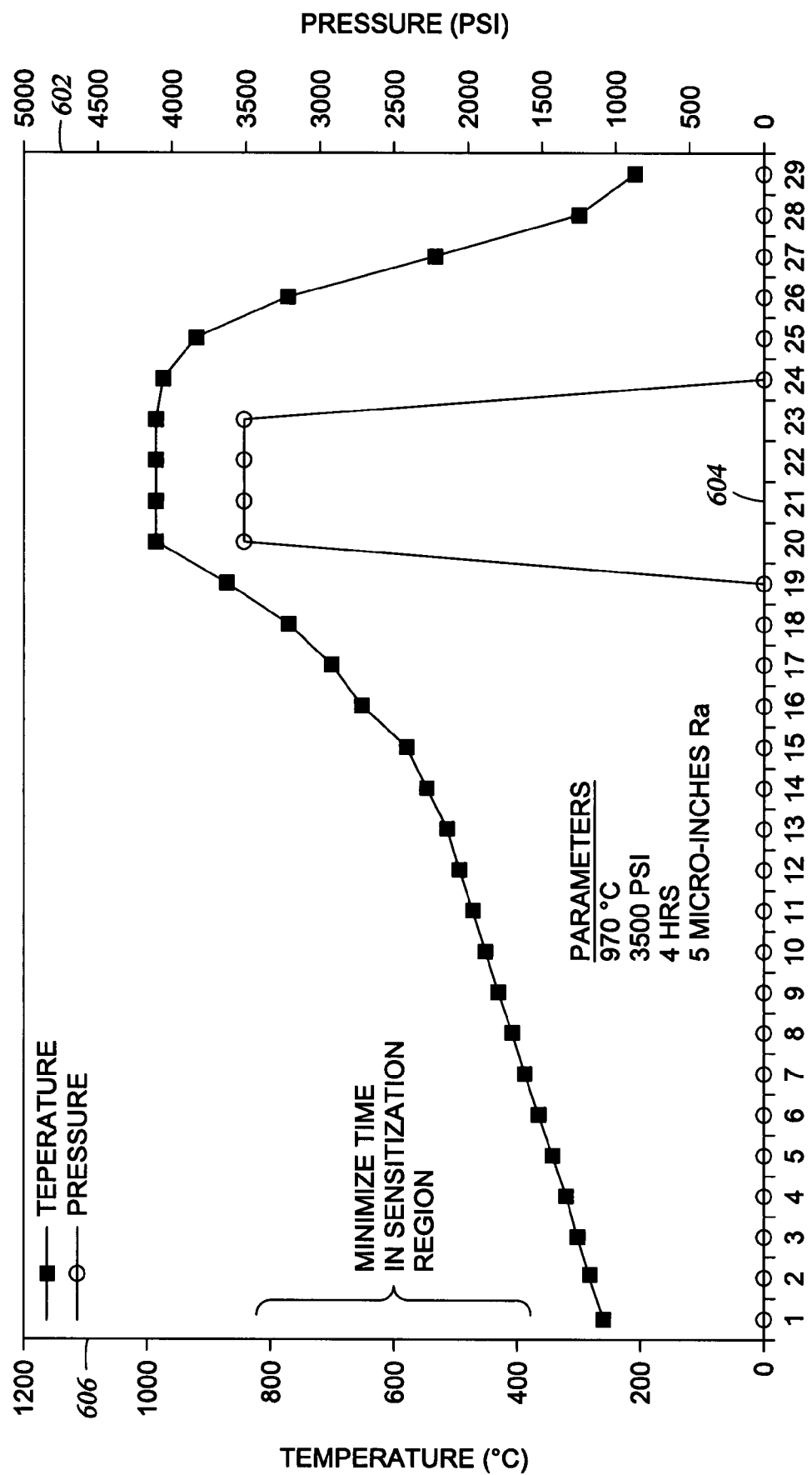
FIG. 6 is a diagram showing one example set of the main processing parameters for diffusion bonding of the kinds of corrosion-resistant steels described herein, which processing parameters are expected to provide advantageous physical properties, when the diffusion bonded part is used for semiconductor fluid flow system applications.

The grain size in the steel or steel alloy is important for maintaining mechanical strength. It is advantageous to have a grain size per ASTM E112 of 5 (635 micrometers average diameter) or finer. Small grains are also less likely to precipitate iron carbides at the grain boundaries, where such carbides will decrease corrosion resistance. If the temperature is too high during diffusion bonding, and the carbon content is too high, large grains will grow, and even though good bonding will occur due to the large size grain growth, the strength of the material will be lower and the corrosion resistance will be deteriorated. The advantage of the "low carbon" austenitic stainless steels is their ability to maintain corrosion resistance when subjected to a particular level of temperature over a certain period of time, which is inversely related to the carbon content. This characteristic is known in the steel industry as sensitization. Therefore, it is very important to minimize the carbon within the stainless steel and to minimize the cooling time of the diffusion bonding. A cooling cycle that takes a full day may leave the parts within the sensitization region for too many hours and may lead to sensitized material. A fast cooling time, on the order of 30 minutes to a few hours is more appropriate for the amount of carbon (0.08% by weight or less, and typically about 0.02% by weight or less) which is shown in the table above. FIG. 6 shows a diagram of the main parameters, temperature, pressure, and time, for diffusion bonding of the steels described above. FIG. 6 also indicates the region where sensitization can occur if the carbon content is too high.

If the steel contains defects that are caused by intentionally or unintentionally added contaminants identified as inclusions, such inclusions may be initiating points for corrosion, may create lower strength material, and may be the root cause of leakage, or even inhibit high quality bonding in general. Per SEMI F20, the inclusion requirement under ASTM E45 must be met such that at the billet stage: type A inclusions thin=1.5 or less and heavy=1.0 or less; type B inclusions thin=1.0 or less and heavy=1.0 or less; type C inclusions thin=1.0 or less and heavy=1.0 or less; and type D inclusions thin=1.5 or less and heavy=1.0 or less.

To achieve a high quality bond, the mating surface or surfaces of the steel or steel alloy which is to be diffusion bonded must be processed to provide a surface roughness which is less than 10 Ra micro-inches. Typically the surface roughness ranges between about 3 Ra micro-inches and about 10 Ra micro-inches, and more typically, the surface roughness ranges between about 5 RA micro-inches and 10 Ra micro-inches. To obtain this surface finish prior to diffusion bonding, the surfaces to be bonded are typically treated after receipt from the mill by lapping, fine grinding, cold rolling, or electropolishing. This surface finishing is carried out after all machining and/or etching of patterns into and/or through the surfaces of the sheets to be bonded; subsequent to creation of alignment holes (but prior to insertion of alignment pins); subsequent to any surface treatments in the areas to be counterbored; and, subsequent to electropolishing of holes and channels.

Lapping is a method of polishing flat material by placing a plate/sheet of material between rotating surfaces in the presence of polishing compound. Equipment capable of performing lapping, for example and not by way of limitation, is a Lapmaster Model 56 available from Lapmaster, Inc., having offices in Mt. Prospect, Ill. Fine grinding, an alternative, is differentiated from lapping in that rather than using a polishing compound, grinding discs are used, where diamond abrasive particles are bonded to the moving disc. This process has the advantage of increased production throughput. As a grinding system, it also assists in meeting the surface finish, flatness, thickness and parallelism requirements (where the parallelism is important for multiple plate stacking in uniaxial diffusion bonding, as well as a low 0.001 inch thickness tolerancing for stop block technique (described subsequently) which is often used for uniaxial diffusion bonding. Equipment capable of performing fine grinding, for example and not by way of limitation, is the Melchiorre ELC 1200, available from Lapmaster, Inc.

Another method of achieving the required surface finish is by cold rolling. Cold rolling is capable of providing the fine surface finish when highly polished rollers are used. Cold rolling is a very efficient process and is capable of meeting the flatness, thickness, and parallelism requirements for plates/sheets. Additionally, the cold rolling process is capable of adding dislocations by performing multi-pass rolling. Such dislocations in the material will initiate new grain growth during the high temperature bonding process, thereby increasing the quantity of smaller grains. A 4-high rolling mill is capable of meeting the requirement and if further precision is needed, a z-mill, or sendzimer mill is recommended. Finally, surfaces may be textured by metal forming on a preform surface in a hot or cold state.

While it is necessary to lap, fine grind, cold roll, or texture only the bonding surfaces of the plates/sheets to obtain diffusion bonding of the sheets which make up the fluid flow component being fabricated, a part of the overall process of obtaining the desired surface roughness on mating surfaces to be diffusion bonded may include electropolishing process which can also be used to polish the patterned channel surfaces and through hole surfaces as well, as mentioned above. Polishing of these surfaces is also helpful in reducing particulates which may be generated by fluid flow over these surfaces after the fluid flow device (component) is placed in use. Additional methods of finishing of the interior surface of fluid flow components are currently known in the art, and we are currently developing methods specifically designed to improve the interior surface of diffusion bonded fluid flow devices.

In addition to the surface finish, to obtain good diffusion bonding, the flatness of sheets to be bonded should be ±0.001 inches overall and ±0.0005 over any 2 inch area or greater in a restrained condition. For uniaxial diffusion bonding, the parallelism of the sheet should be ±0.001 inches overall and ±0.0005 over any 2 inch or larger area. Also, for uniaxial diffusion bonding with multiple stacking of parts and the use of stop block technique, the thickness tolerance of the sheet should be ±0.0005 inches. For HIP diffusion bonding, the thickness tolerance of the sheet and parallelism requirements are not relevant due to the uniform pressure loading over all surfaces. Once the surface finish on the sheets has been completed, deburring at a diffusion bonding edge should not exceed 0.005 inch maximum radius.

In addition to the surface roughness, the cleanliness of the mating surface to be diffusion bonded must be controlled. While one skilled in the art can empirically develop a cleaning process which will provide the especially clean surface required for diffusion bonding, we have developed a cleaning process which has performed particularly well. The following cleaning steps are performed:

1. Soaking of the sheets in an alkaline degreaser. An example of such a degreaser would be Enbond Q527™ or an equivalent in terms of functionality.

2. Dragging the sheets through a spray or immersion bath of ≧200K Ohm-cm water at ambient temperature.

3. Immersing the sheets in an acid etching solution for 2 minutes, where the acid etching solution consists of HF at 1% by volume-5% by volume, $HNO_3$ at 15% by volume-25% by volume, and DI (deionized) water as the remainder of the volume %.

4. Dragging the sheets through a spray or immersion bath of ≧200K Ohm-cm water at ambient temperature.

5. Power spraying the sheets at room temperature with ≧4M Ohm-cm water for a time period of 0.5 minutes to 4 minutes.

6. Immersing the sheets in an acid cleaning solution for about 2 to about 15 minutes, where the acid cleaning solution consists of $HNO_3$ at 40% by volume-60% by volume, with DI water as the remainder of the volume %.

7. Dragging the sheets through a spray or immersion bath of ≧200K Ohm-cm water at ambient temperature.

8. Power spraying the sheets at room temperature with ≧4M Ohm-cm water for a time period of 0.5 minutes to 4 minutes.

9. Immersing the sheets in 2M Ohm-cm water for a time period of 10 minutes to 30 minutes.

10. Immersing the sheets in 4M Ohm-cm water for a time period of 10 minutes to 30 minutes.

11. Examining the sheets under a black light for loose particulates.

In most instances, due to the formation of native oxides on the surface of the cleaned plates/sheets in the presence of ambient oxygen, it is necessary to remove the oxides prior to diffusion bonding. This requires an additional step:

12. Use of laser ablation, or a kinetic process in general, to remove the native oxide. This laser ablation should be carried out under an inert gas and the environment in the diffusion bonding processing area should also be under an inert gas until such time as all of the sheets are stacked and tac welded in place, to prevent oxidation of the bonding surfaces prior to the diffusion bonding process.

In the case of uniaxial loaded diffusion bonding, it is important to design the pattern in the plates to be diffusion bonded so that the change in dimensions which occurs during the diffusion bonding process is accounted for in the patterning of the sheets. For example the location and dimension of a through hole will shift slightly due to the pressure applied during the diffusion bonding process at bonding temperature. One of skill in the art, in view of the processing conditions to be applied during bonding of the sheets, can calculate what the expected movement of patterns within individual sheets should be, and can adjust the pattern dimensions within the sheet to compensate appropriately. For example, assuming a uniform expansion and a 3% crush over the full interval of bonding time, the dimensional changes expected can be estimated. Diffusion bonding using a HIP technique does not require accounting for dimensional changes due to the application of pressure, since the pressure is equally applied from all directions.

The patterns on the sheets of material to be diffusion bonded need to be aligned and held in place during the diffusion bonding process. In the embodiments described subsequently herein, the sheets were held in place using alignment pins during tac welding around the exterior of the sheets. If the alignment pins are made of the same material as that of the sheets being bonded, they can remain in place during bonding. If the HIP diffusion bonding technique is used, then the holes for the alignment pins should not extend through the entire thickness of the sheet, and the holes should contain a path so that air cannot be trapped under the pin prior to vacuum welding.

The mechanical requirements for the steel sheets, as stated in ASTM A240 and required by SEMI F20 are: Tensile Strength minimum is a minimum of 70 ksi (485 Mpa) (49.2 Kgf/mm$^2$); Yield Strength is a minimum of 25 ksi (170 Mpa) (17.6 Kgf/mm$^2$) offset at 0.2%; Elongation is 2 inches or 50 mm, minimum 40%; and Hardness is a maximum of 217 Hardness Brinell (HB) or 95 Rockwell B.

The pressure, temperature, and time conditions used during diffusion bonding of the sheets are designed to achieve a crush (defined as the percentage reduction in height of the sheets being bonded) ranging between about 0.75% and about 3% when the roughness of the surfaces of the mating sheets ranges from about 5 micro-inches Ra to about 10 micro-inches Ra. Typically the amount of crush used is in the range of about 1.5% to 2.5%. The processing diagram 600 in FIG. 6 shows the pressure in psi on axis 602, the temperature in ° C. on axis 606 and the time in hours on axis 604. The stack of sheets was as illustrated in FIG. 2C, which is discussed subsequently herein. Once the temperature of the stack of sheets was at about 970° C., the stack, under a pressure of approximately 3,500 psi, was held for a soak time of about 4 hours to achieve good diffusion bonding. The stack of sheets was then cooled at a rate which provided an acceptable product, however, it was subsequently learned that in order to improve corrosion resistance, the stack of sheets should have been cooled more rapidly, to minimize the time spent in the sensitization region.

After bonding, the material should meet the intergranular corrosion requirements as SEMI F20 refers to Practice E of ASTM A262. Measurements should be performed in the sensitized condition (1 hour at 677° C.). This type of test is typically used as a screening test for corrosion by the metals fabrication industry.

As previously mentioned, while it is possible to machine patterns into the layers of metal which are to be diffusion bonded, it is more economical to etch a pattern into the layer in most instances, using either chemical etching of the kind known in the metal processing arts or plasma etching of the kind known in the semiconductor arts. When the pattern is to be etched entirely through a layer of metal, the metal layer typically has a thickness within the range of about 0.0005 inch to about 0.06 inch; more typically, about 0.002 inch to about 0.05 inch; most typically, about 0.025 inch. When the pattern is to be machined by CNC milling, the metal sheet, or layer has a thickness within the range of about 0.060 inch to about 0.375 inch, more typically about 0.125 inch to about 0.3125 inch, and most typically, about 0.250 inch. Use of a series of thin metal layers which are diffusion bonded enables the formation of more complex fluid flow conduits in a substrate and more complex device elements, while managing internal surface finish within the diffusion bonded substrate or device. The smoothness of the interior surface finish of the fluid flow conduits is improved by treatment of the internal surface of the fluid flow conduits using abrasive flow machining, such as ultrasonic energized slurry, to remove any waviness (where waviness refers to long wavelength surface undulations typically on the order of the thickness of the layers) which is generated during the machine patterning process and internal crevices created during alignment and stacking of the sheets.

A metal sheet/layer typically includes a series of through-holes and blind grooves or channels, so that, when the layers are stacked in a particular manner, an aligned combination of the through-holes provides specific desired internal shapes within the stack. The internal shapes include channels or other functional device structures. The through-holes are typically round or oblong in shape, to minimize protruding sharp edges and corners which can wear and produce particulates during operation of the fluid delivery system. The internal shapes will very likely have corners and rough surfaces prior to bonding when CNC milling is used to create the through-holes, blind grooves and channels. The metal layers are advantageously pattern etched using chemical etching, electrochemical etching, or a combination thereof. The chemical etching or electrochemical etching generally provides higher productivity. Other methods of patterning layers/sheets may be die sink electro-discharge machining, or ultrasonically agitated abrasives combined with electrochemical machining, plasma etching, pulse electrochemical machining, or a combination thereof, by way of example and not by way of limitation.

Some of the above-described processes induce a certain amount of stress into the material which can upset the flatness of the sheet. Therefore, any method used to pattern the sheets should be designed to be low in stress creation, or a subsequent step to remove needs to be performed on the sheet, such as annealing or ultrasonic treatment. Removal of the stress from the sheets ensures flatness of the final part, such as a fluid flow manifold of the kind shown in FIGS. 2A-2F.

The use electrochemical etching for metal removal tends to provide a smoother surface on a through-hole, which aids in reduction of sources of particulate contamination from the fluid handling network architecture. In the case where the electrochemical etching is performed with the aid of a lithographic photomask, and after the photomask is removed, the electrochemical treatment method can be used to reduce the roughness of the surfaces which are to be bonded during the diffusion bonding process, enabling better diffusion bonding. Isotropic etching by photo electrochemical metal removal techniques creates a wavy profile on deep holes. To reduce the wavy features, the anisotropy of the metal removal is increased using ultrasonically agitated abrasive which provides preferential material ejection normal from the surface of the metal during the electrochemical etching process.

In some instances, when the thickness of the metal sheet on which lithographic patterning is to be carried out exceeds 0.06 inches, it may be more practical to CNC machine the pattern into the metal, and then to subsequently create a surface finish on the machined layer which meets the requirements described above.

Various component devices, such as laminar flow devices, mass flow controllers or flow sensing devices, flow restrictors, on/off valves, check valves, filters, pressure regulators, and pressure sensors (for example and not by way of limitation), may be incorporated at least in part into the layered structures described above. In some instances a portion of a component device may be surface mounted on the fluid handling network architecture, when it is not practical to include elements of the device in the multilayered structure. The exemplary examples provided below are related to the diffusion bonding of patterned steel sheets to form fluid flow manifolds to which "top mounted" devices may be attached, or to the diffusion bonding of patterned steel sheets which include integrated device structures as a part of the diffusion bonded configuration/structure.

Figure 1B:
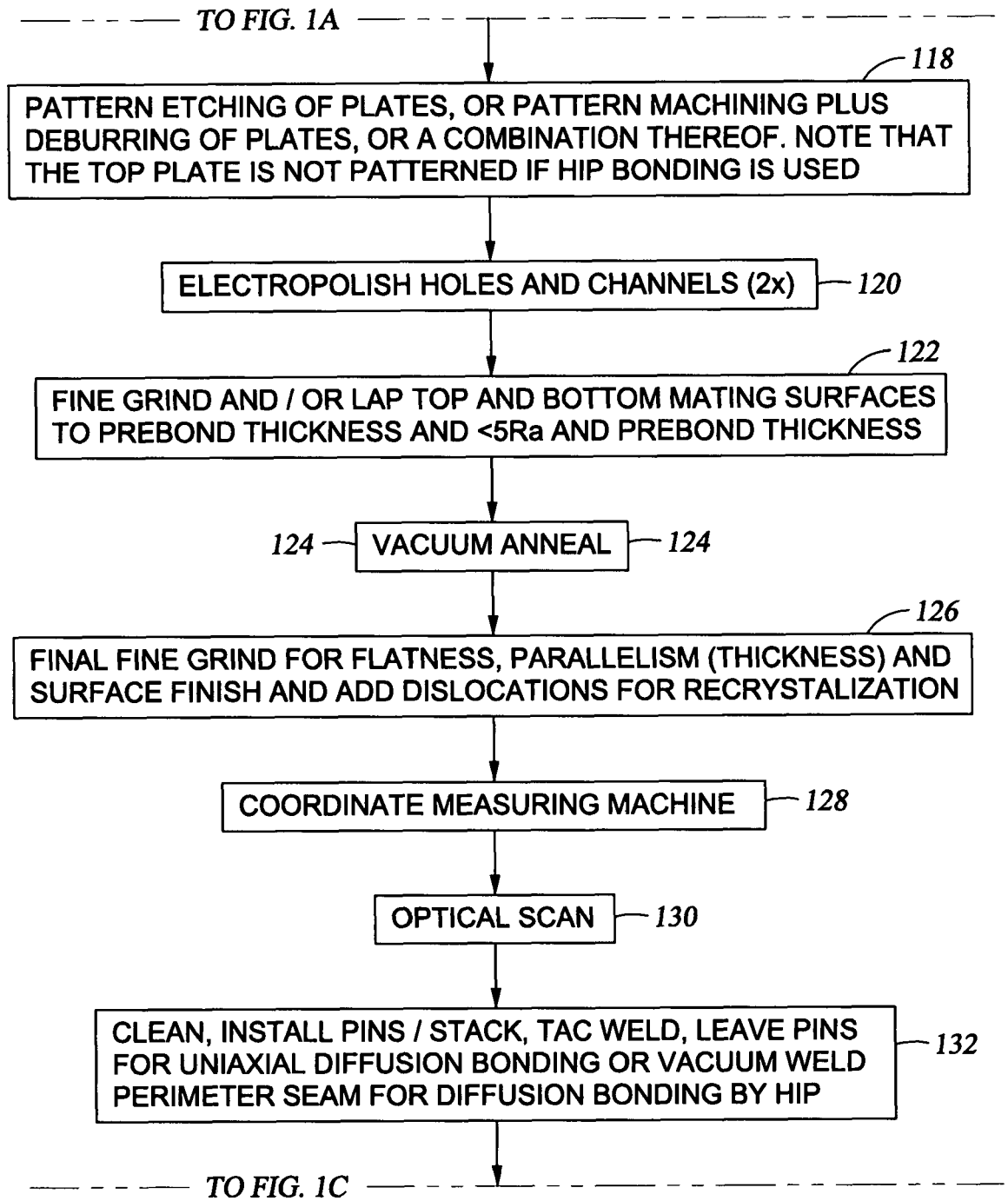
FIG. 1B is the second page of a process flow diagram showing basic steps which may be used for the preparation of a diffusion bonded fluid flow channel, such as a gas stick, by way of example and not by way of limitation.
Figure 1C:
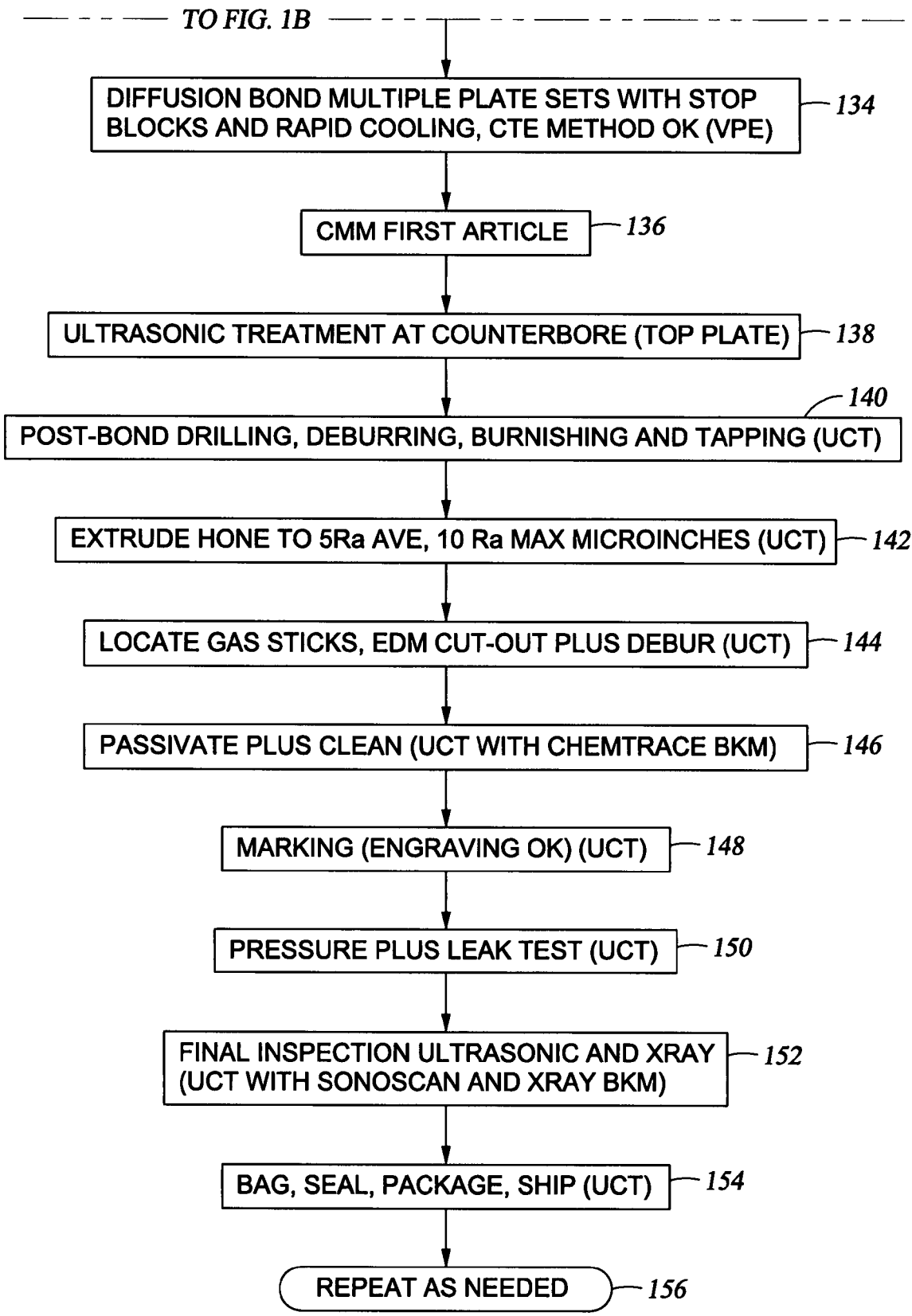
FIG. 1C is the third page of a process flow diagram showing basic steps which may be used for the preparation of a diffusion bonded fluid flow channel, such as a gas stick, by way of example and not by way of limitation.

FIG. 1 shows a process flow chart 100 for a diffusion bonding process which is generally representative of the method of the invention. Depending on the materials used and the end use application for the diffusion bonded structure, some of the steps shown in FIG. 1 may not be used. In some instances, substrate materials may be purchased which have already been processed through a portion of the steps listed on process flow chart 100.

With reference to FIG. 1, a billet of material to be used to form a substrate is selected 102 from the kinds of corrosion-resistant materials described previously herein. The billet may have the corners cut 104 to a rounded shape. The billet is then typically forged to a slab of material to dimensions that are acceptable for hot rolling, from the billet of material into sheets or plates of the material. The sheets of material are hot rolled 106, using techniques known in the art, from the billet of material into sheets or plates of a thickness which is desired for cold rolling or grinding. Often, the ends of the sheets are trimmed 108 after the hot rolling procedure. Subsequent to sheet preparation, the sheet is pickled and annealed 110, preferably annealed in a vacuum, using techniques known in the art. Subsequently, the sheet is either fin grinded or cold rolled 112 to the final thickness to improve flatness, parallelism and surface finish. After the cold rolling procedure 112, the surface finish ranges from about 2 micro-inches Ra to about 10 micro-inches Ra. The cold rolled or fine grinded sheet is then vacuum annealed 114. Alignment holes to be used for stacking and alignment prior to diffusion bonding processing 134 may be created 116 subsequent to the vacuum annealing process 114. The sheets are then optionally ultrasonically treated (not shown) at counterbore locations on the sheet, where a counter bore will be required during fabrication of a diffusion bonded structure or device. The sheets of material are then either pattern etched, or pattern machined and deburred 118.

When the depth of pattern to be created, or the thickness through which an opening is to be etched exceeds about 0.06 inches to about 0.10 inches, it is often less expensive to machine the pattern. When the depth of pattern to be created, or the thickness through which an opening is to be etched ranges from about 0.0005 inches to about 0.10 (and more typically 0.06) inches, it is often more economical to chemical etch or plasma etch the sheets which are to be processed. The precision of the sheet thickness varies, depending on the manufacturer's specifications, but manufactures can produce sheets having a thickness tolerance of about +0.025 inch to −0.025 inch as hot rolled and +0.001 inch to −0.001 inch when hot rolling is followed by a fine grind, or +0.0005 inch to −0.0005 inch when hot rolling is followed by cold rolling or double disc grinding. The process step of pattern etching of plates/sheets of steel, or the patterning machining and deburring of plates/sheets, or a combination thereof is illustrated in FIG. 1 at 118.

Alternatively, instead of machining or pattern etching or other methods as mentioned directly above, the sheets may be "coined", or cold pressed or cold formed, or hot close-die forged, to provide the patterned features in the sheets.

After the patterning 118 of the sheets, the features may need to be mechanically polished via alumina fiber brushes or may need to be electropolished 124 to provide a finer surface finish on the holes and channels which were not finished by a process in 118 or 122. Processes that are capable of cutting a hole for example, and providing a 5 micro-inch Ra to 20 micro-inch Ra surface finish are Pulse electrochemical machining, coining, and electrochemical etching.

As illustrated in FIG. 1 at 120, prior to diffusion bonding, the surfaces of the sheets are typically electropolished using techniques of the kind known in the art to smooth the surface of the holes and channels in the patterned sheets. Typically the entire sheet to be diffusion bonded is electropolished, so that not only are the patterned areas of the sheet electropolished, but the entire surface of the sheet is electropolished. Since oxide formation at a diffusion bonded interface contributes to a poor bond, it is important to note that too thick of an oxide layer, which may be created during electropolishing, will inhibit good bonding. Therefore, an as-electropolished surface may be acceptable for diffusion bonding when the oxide layer thickness is no greater than 40 Å. With 10 Å to 40 Å thick oxide layers being acceptable. Removal of the oxide layer to a thickness of 10 Å or less is advantageous (to enhance the corrosion resistance on the internal flow passages that were patterned). When the diffusion bonding is carried out at temperatures above about 950° C., and the oxide film on the bonding surface is below about 40 Å, the oxide layer is crushed under pressure to an instable state, the oxide layer does not significantly affect the bond quality at the interface.

Subsequent to electropolishing, the exterior surfaces of the sheets are subjected to fine grinding and/or lapping 122 of all diffusion bonding mating surfaces, so that a final sheet thickness within 0.003 inches over the desired final thickness is removed, and the surface roughness of the mating surfaces is finished to a roughness ranging from about 5 micro-inches Ra to about 10 micro-inches Ra. The sheets may then be vacuum annealed 124 to relieve stress induced by lapping, for example. Optionally, or instead of lapping, if there is sufficient remaining material, the sheets may be processed by a fine grinding process 126 for obtaining a flatness of 0.0005 inches, parallelism of 0.0005 inches, for uniaxial diffusion bonding, and a thickness within ±0.0005 inches, with the desired surface finish. The plates are now prepared and ready to go on to inspection and diffusion bonding.

The plates are then inspected 1 using a coordinate measuring machine 128 and an optical scan 130. After inspection 128 and 130 of the plates/sheets, the sheets are cleaned After inspection 132 of the plates, the plates are cleaned, in the manner previously described; positioning pins are installed by press fitting into place and using liquid nitrogen to temporarily shrink the pins to fit into the alignment holes; and, the sheets are stacked for bonding 132. The stacked plates are Tac welded, with the pins left in place 132. The tac welding is used to hold the plates stationary during stacking operations and in the event there is uneven loading as pressure is applied. The sheets are tac welded at the perimeter of the interface between sheets, at 3 or 4 locations per side of the stack. Subsequently the plates may be uniaxially diffusion bonded 134 using a hydraulic press. In fabrication of a fluid flow manifold of the kind shown in FIGS. 2A-2F, the stainless steel sheets are stacked in pairs because there is a top sheet and a bottom sheet. There may be any multiple of sheets bonded when stacked. In this case, each multiple of stacked sheets is called a plate set. There may be multiple plate sets bonded in a single diffusion bond furnace cycle. Each plate set is separated by separator sheets and a load redistribution block. Generally, the load re-distribution block is 2 to 5 inches thick and toleranced on thickness, flat, and parallel, to the same requirement as the part sheets. The separator sheets prevent the plate set from bonding to the redistribution block. The separator sheets may be made of molybdenum or stainless steel, but must be coated with a material such as yttrium oxide in order to prevent the parts from adhering to the redistribution blocks which are typically graphite. The yttrium oxide may be e-beam sputter deposited to make a film which is strongly adhered to the separator sheet. The load redistribution block is used to evenly redistribute the load of bonding over the next stacked plate set. As one plate set has high and low loading points distributed across the entire plate set, defined by holes and no holes, the load redistribution block redistributes the load evenly across the next part. The load redistribution blocks and cones are made of graphite.

A set of stop block are used to limit the crush on the plate sets. The stop blocks, also made of graphite, perform several functions. First, the stop blocks limit the amount of crush applied to the parts. The stop block dimensions are chosen to reduce the loading by at least 50% when the crush is achieved. Second, the stop blocks lead to a uniform loading once engaged, so the variances due to thickness, flatness, and parallelism are redistributed over the entire loading surface.

The entire set of parts within the furnace are used to ensure a high quality bond. The plate sets are stacked into the furnace with separator sheets, load redistribution blocks, and stop blocks. The flatness, and parallelism tolerance stack up for each of these parts must be optimized to ensure uniform lateral loading across the plate sets. Thickness tolerance must be managed to achieve a precise crush %.

Subsequent to the diffusion bonding of the sheets, a dimensional inspection 136 of the diffusion bonding is carried out using a coordinate measuring machine, to see whether all of the patterns which were present in the sheets prior to bonding have lined up properly during bonding 134, to provide a finished structure which is acceptable.

After diffusion bonding 134 and inspection 136 of the diffusion bonded structure, optionally, an ultrasonic treatment 138 is carried out at locations where counterboring will subsequently be done. Drilling, deburring, burnishing and tapping 140 are then carried out, to provide any external fittings or points of attachment which are required for the end use application. Burnishing is not required if ultrasonic treatment was performed.

Following the post-bonding drilling, deburring, burnishing and tapping 140, the interior surface of the bonded structure may be abrasive flow machined 142 to an acceptable finish, which is typically in a range from about 5 micro inches Ra to about 10 micro-inches Ra. A technique known in the art as "Extrude Hone", carried out on equipment manufactured by Extrude Hone, is one of the methods of abrasive flow machining which may be used.

When the diffusion bonded structure includes more than one part, the individual part dimensions are located, the parts are cut out of the structure, and the edges of the cut parts are deburred 144. Subsequent to separation of the individual parts from a structure, and prior to electropolishing, the individual parts are passivated and cleaned 146. In this instance, "passivated" refers to the enhancement of the chromium at the surface, to a depth of about 20 Å, to yield a chrome oxide surface for improved corrosion resistance. When the fabrication sheets are 316L stainless steel, this material requires the chromium passivation, whereas other materials such as Inconel® 625 and Hastelloy® C22 will not require such passivation for superior corrosion resistance. The cleaning should be performed to make the part free of particles generated during processing.

Each part is then marked 148. Part marking may be performed by lasers or other clean marking methods. Subsequent to marking, each part is pressure and leak tested 150 to be certain that all of the sheets are properly diffusion bonded and fit for use. Helium may be used for the leak testing and nitrogen may be used for the pressure testing. Leak testing should meet the requirements of 1 $e^{-9}$ atm cc/s with helium. Final inspection of the parts optionally includes ultrasonic imaging and/or X-ray 152. Both methods provide qualitative measurements of the bond interface. Ultrasonic scanning provides a surface map of the interface by projecting ultrasonic waves through the part and then measuring the amplitude of reflected signal. Higher amplitude reflections are the effect of voids at the interface and may produce a 2D map of bond quality. X rays interact with the voids at the interface to provide indication of bond quality. Either or both methods may be used to analyze the bond quality on a sampling basis.

Parts which pass final inspection are bagged in a sealed bag, packaged, and shipped 154. The bagging protects the parts from exposure during shipping and storage prior to use.

Any of the steps referred to in description of Process Flow Chart 100 may be repeated 156 as necessary during the fabrication process.

EXEMPLARY EMBODIMENTS

Example One

This embodiment is a first level production of a gas stick of the kind used in semiconductor processing. Two sheets of material are diffusion bonded to produce a corrosion-resistant leak-proof manifold containing fluid flow channels which can be connected to various devices which are "top mounted" on an exterior surface of the manifold. The manifold with devices mounted on the surface is referred to in the semiconductor industry as a gas stick. The sheets of material used to produce the manifold are machined using a CNC (computer Numerical Control) machining tool, to produce openings and/or channels in sheets of material which are to be diffusion bonded to form the manifold.

Figure 2A:
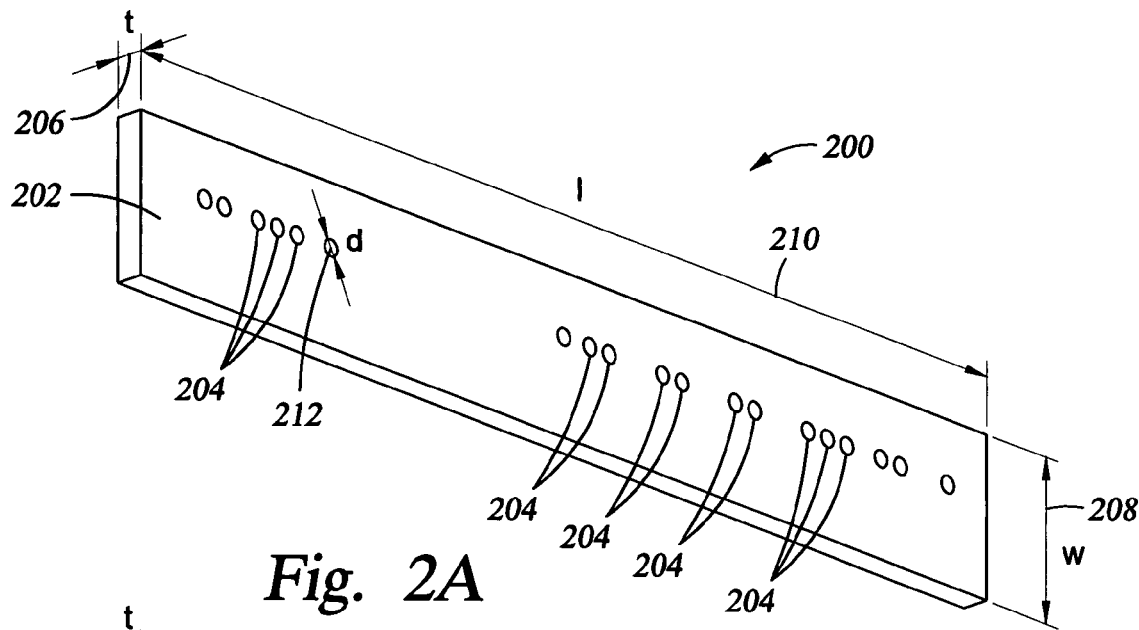
FIG. 2A is a schematic diagram of the top sheet of a patterned material which is to be diffusion bonded to a bottom sheet to form a substrate. The substrate can be used as part of a fluid flow system of a gas stick of the kind useful as a part of semiconductor processing apparatus. This
Figure 2B:
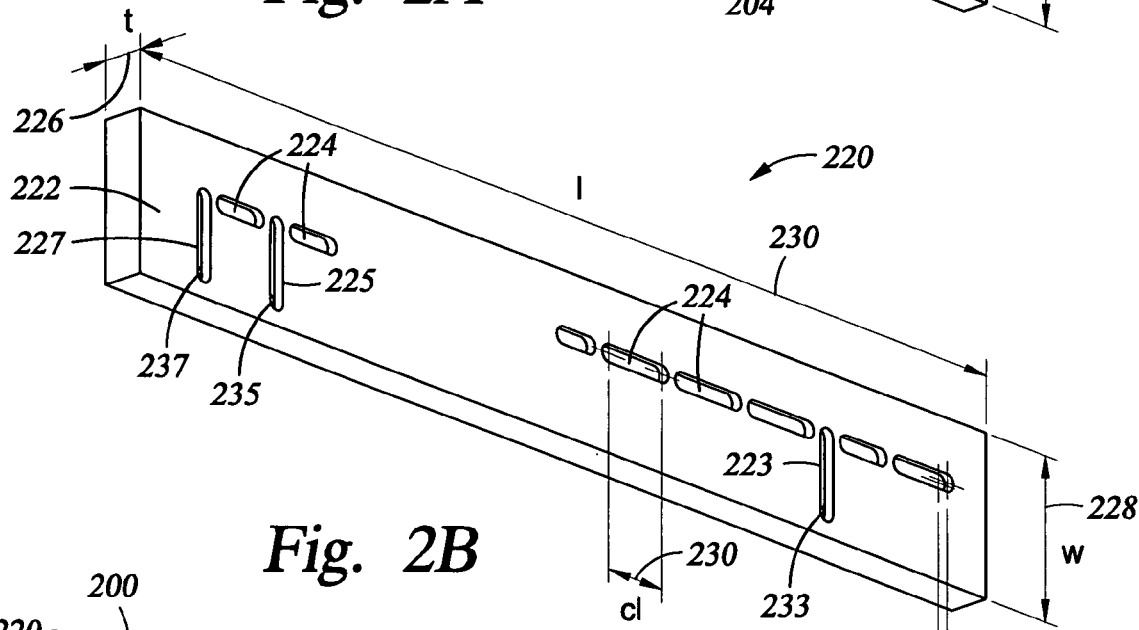
FIG. 2B is a schematic diagram of the bottom sheet of a patterned material which is to be bonded to the top sheet referenced in FIG. 2A
Figure 2C:
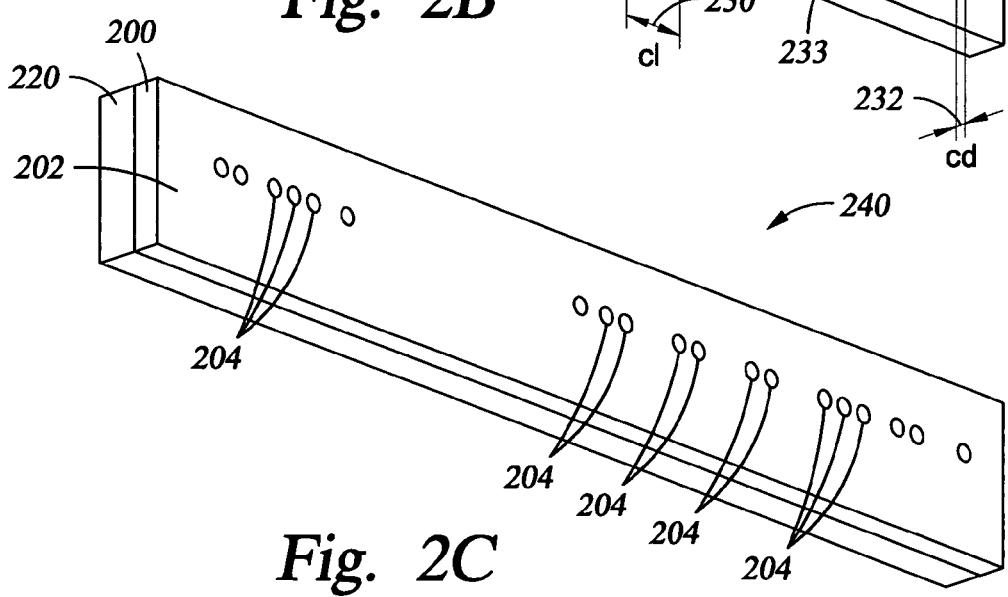
FIG. 2C is a schematic diagram of the assembly of the top sheet and the bottom sheet of the substrate for a gas stick of the kind useful as a part of a semiconductor processing apparatus.

The manifold which was produced in the present instance is shown in FIGS. 2A through 2F. FIG. 2A shows the top sheet 200 of the manifold after the machining of openings (through holes) 204 through the top sheet 200. The pattern of openings is based on the devices which are to be attached to the surface 202 of the completed gas stick manifold (not shown). The thickness 206($t$) of top sheet 200 was 0.130 inches. The width 208($w$) of top sheet 200 was 1.380 inches. The length 210($l$) of top sheet 200 was 12.537 inches. The diameter 212($d$) of each of the openings 204 was 0.177 inches. The material of construction of top sheet 200 was stainless steel 316L, as this was one of the better corrosion-resistant stainless steel materials currently available on the market.

FIG. 2B shows the bottom sheet 220 of the manifold after machining of channels 224 into the surface 222 of bottom sheet 220. The pattern of the channels 224 in bottom sheet 220 also depends on the devices which are to be attached to the surface 202 of the completed gas stick manifold. The thickness 226($t$) of bottom sheet 220 was 0.230 inches. The width 228($w$) of bottom sheet 220 was 1.380 inches. The length 230($l$) of bottom sheet 220 was 12.537 inches. The channel length 230($cl$) of the channels varied, depending on the channel which was needed for use with the device to be attached to the completed gas stick manifold. Excluding the end radius of the channels, the channel length 230 ranged between about 0.305 inches to about 0.840 inches. The depth of the channel (cd) 232 (not shown for all channels) was about 0.190 inches at the center of the channel. The material of construction of bottom sheet 220 was also stainless steel 316 L.

Figure 7:
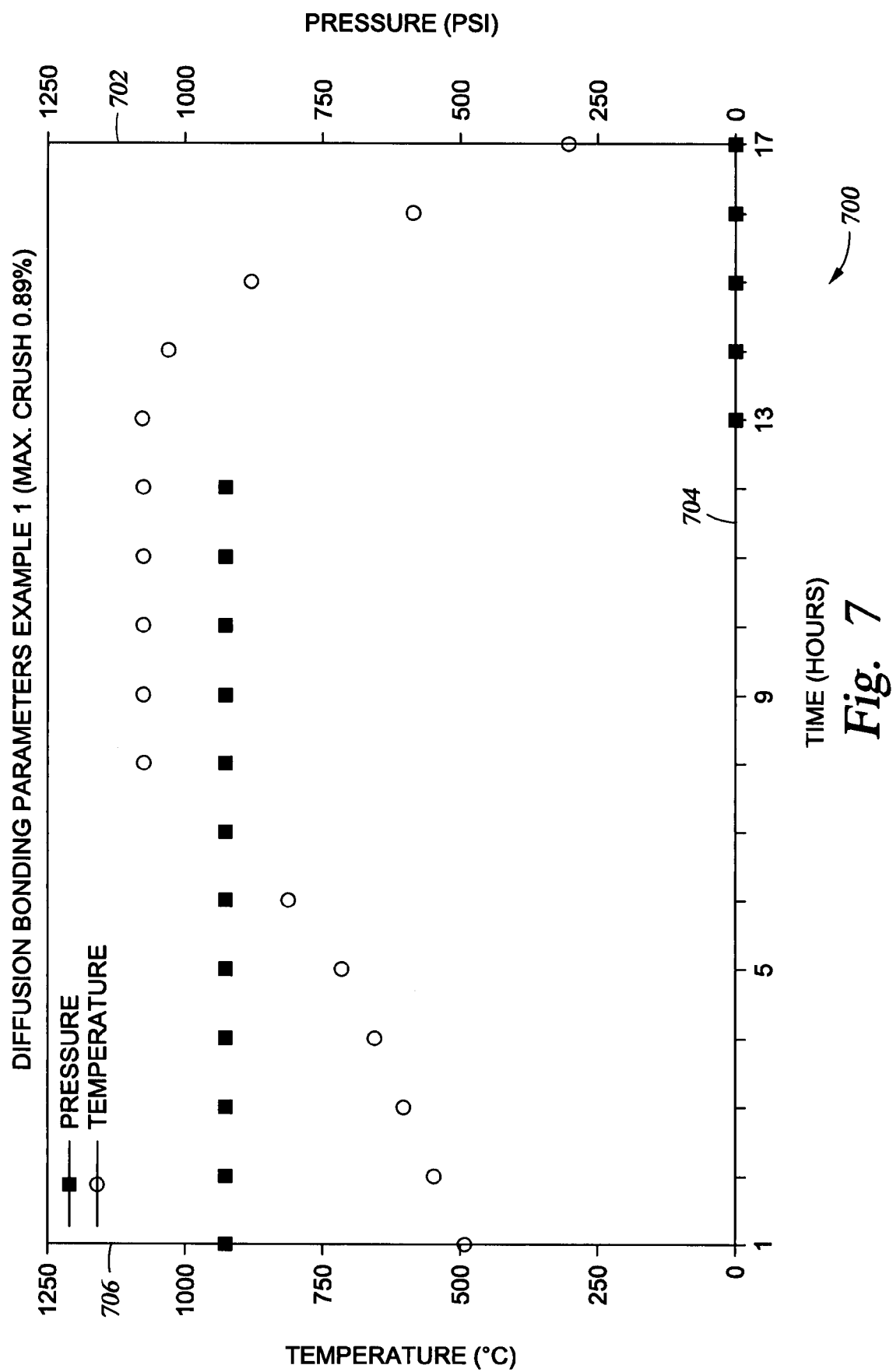
FIG. 7 is a diagram showing a second example set of the main processing parameters which were used for diffusion bonding of a 316 L stainless steel, which processing parameters provided a satisfactory part when leak tested and when tested for mechanical properties. These processing parameters are illustrated in Example 1.

FIG. 2C shows the assembly 240 of top sheet 200 overlying bottom sheet 220, with openings 204 present on the top surface 202 of top sheet 200. This assembly was diffusion bonded after passing through preparatory steps 102 through 134 as illustrated on FIGS. 1A and 1B. The diffusion bonding was carried out where the assembly was open to the vacuum in the furnace and pressed between two plates. Separator sheets of 316 L stainless steel which was electron-beam-coated with yttrium oxide were used between the top and bottom load redistribution plates and the assembly during bonding, to permit ease of removal of the bonded assembly from the stacked graphite load redistribution blocks used during the bonding. FIG. 7 illustrates the general processing conditions during diffusion bonding. The vacuum furnace was held at $9.7 \times 10^{-6}$ Torr to $2 \times 10^{-4}$ Torr during diffusion bonding. The pressure axially applied pressure was about 930 psi. The holding temperature at which the assembly was diffusion bonded was about 1,075° C., and the holding time period was about 5 hours. A temperature below about 950° C. does not volatilize oxides at the bonding surfaces, and such volatilization is helpful in the bonding process. With respect to the maximum bonding temperature, for 316 L stainless steel, a temperature above about 985° C. increases grain growth within the sheets being bonded and therefore reduces overall strength of the bonded sheets. In Example One, the holding temperature was higher than desired, and the grain size of the bulk material was higher than desired, at about 0.5 (an average grain diameter of about 302 micro meters), when tested in accordance with the ASTM testing method previously described. While the 1,075° C. holding temperature was higher than desired, the mechanical properties and the leak testing of the diffusion bonded part were acceptable.

Figure 2D:
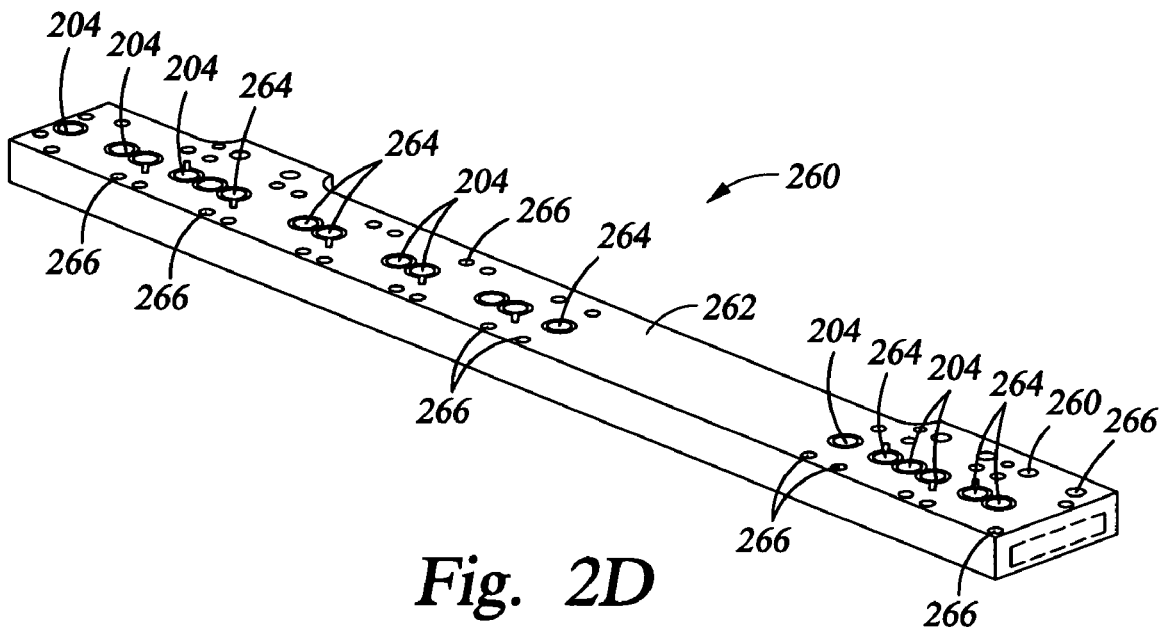
FIG. 2D shows a schematic view of the diffusion bonded gas stick assembly, emphasizing the top surface of the assembly, which has been subsequently machined to provide for sealing devices on the top surface, and to provide for the attachment of such devices.

FIG. 2D shows a slightly different design than that illustrated in FIGS. 2A through 2C, as this design is a toxic SDS w/divert. The diffusion bonded gas stick manifold 260, illustrating the top surface 262, which has been further machined subsequent to diffusion bonding. Openings (through holes) 204 remain as originally pattern machined. The area 264 surrounding openings 204 has been hardened and machined to provide a mating surface for a seal which is used between openings 204 and a device (not shown) which is surface mounted over openings 204. Threaded holes 266 have been machined into bonded gas stick manifold 260 to permit attachment of devices (not shown) which are surface mounted over openings 204.

Figure 2E:
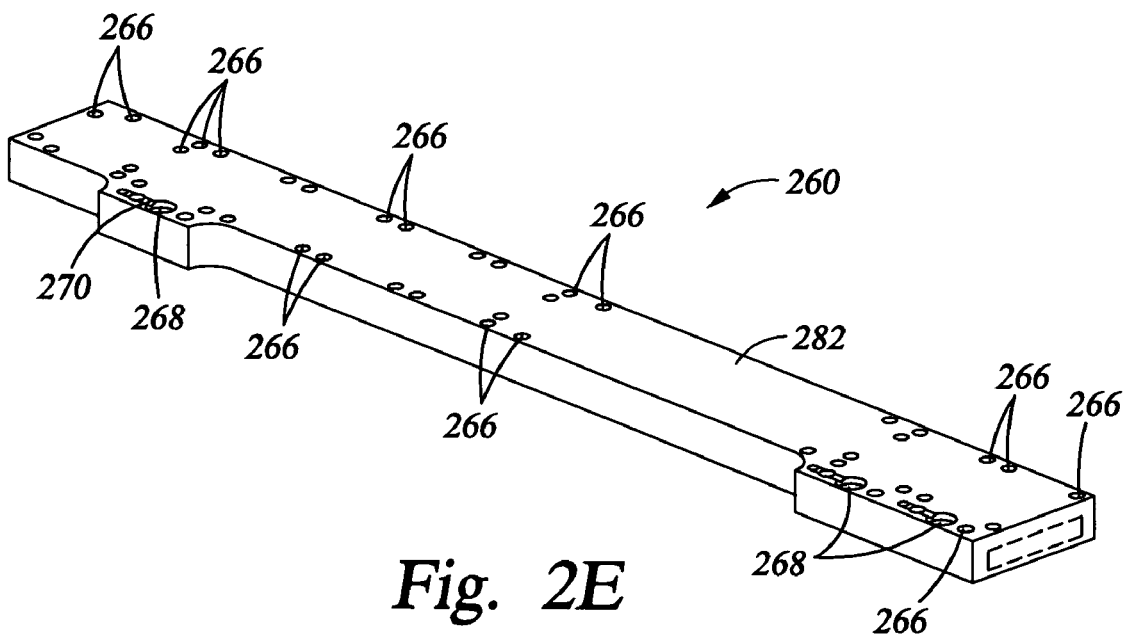
FIG. 2E shows a schematic view of the diffusion bonded gas stick assembly, emphasizing the bottom surface of the assembly, to show the machining for device attachment and openings for purge gas entry and exit from the gas stick assembly, as well as process gas exit openings.

FIG. 2E shows the diffusion bonded gas stick manifold 260 illustrating the bottom surface 282, which has been further machined subsequent to diffusion bonding. Additional Openings (through holes) 232, 235, 237 remain as originally pattern machined. The area 264 surrounding openings 232, 235, 237 have been machined through the bottom surface 282 of diffusion bonded gas stick manifold 260 and to flow fluid out of the gas stick at 237. The area 270 surrounding openings 232,235,237 has been hardened to 300 vickers or greater to enable machining of a mating surface for a seal (not shown) which is used between openings 232,235,237 and a device (not shown) which connects to the purge gas system (not shown and a downstream manifold (not shown) or to a process chamber (not shown). The 300 vickers hardness ensures that a top mounted seal experiences plastic deformation rather than the substrate or opposite counterbore on the top mounted component. One method of increasing the hardness in the area of counterbores is to perform ultrasonic peening of the surface prior to forming the holes in the top plate. If the ultrasonic peening is performed after the holes are cut, this causes material to flow into the hole during the ultrasonic peening, affecting the hole profile. Again, threaded holes 266 are present on diffusion bonded gas stick manifold 260 to permit attachment of devices (not shown) which are surface mounted over openings 204 which are shown in FIG. 2D. The gas sticks were subsequently hydrostatically tested according to ANSI (NFPA) T2.6.1 up to a pressure of about 11,000 psi, without the detection of any leakage at the bonded interface.

Figure 2F:
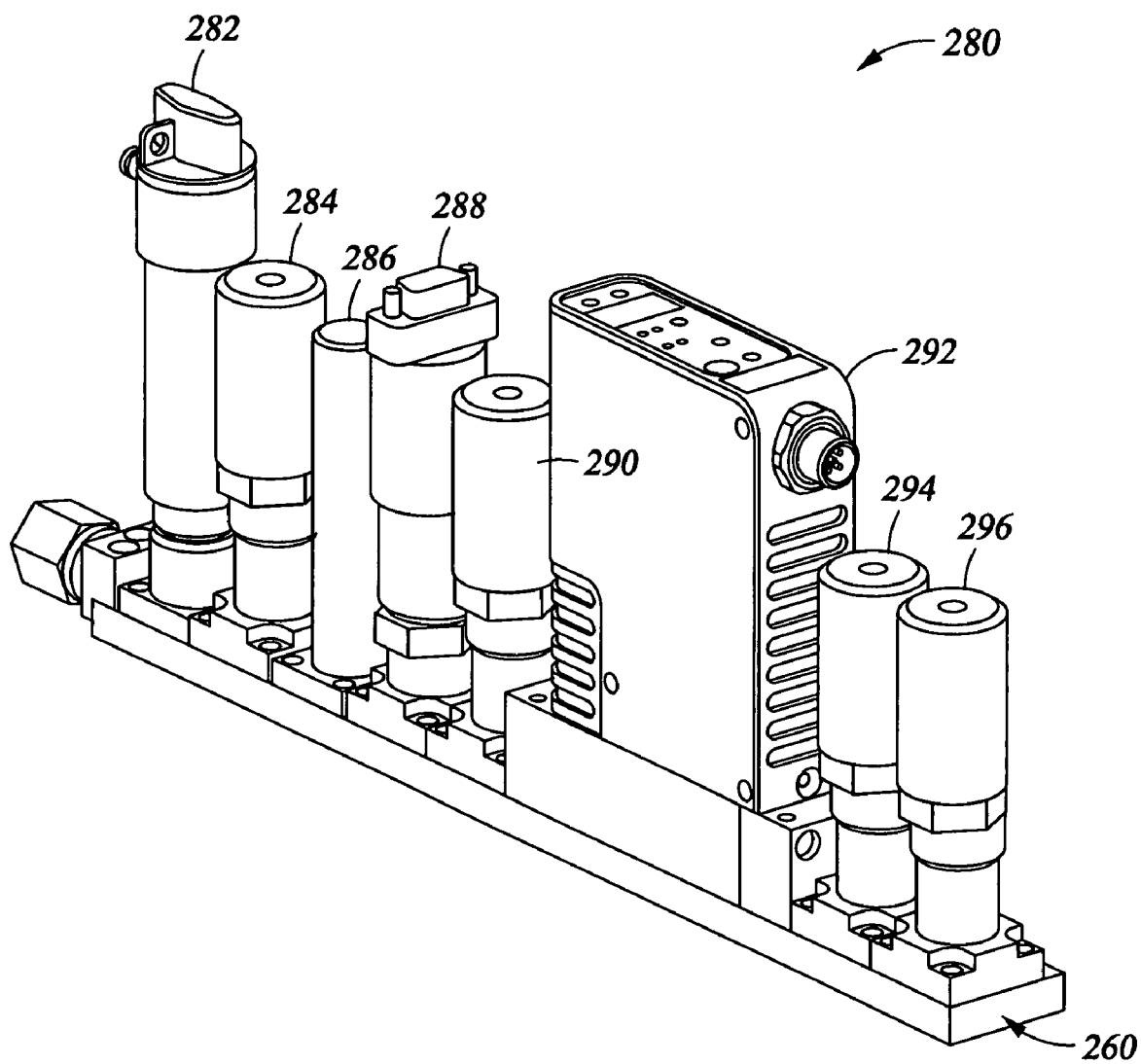
FIG. 2F shows the diffusion bonded gas stick after the top mounting of various device elements on the gas stick.

FIG. 2F shows the gas stick manifold 260 with a number of component device attached to the top surface of manifold 260. these components include a manual valve 282, a 3 port valve 284, a filter 286, a transducer 288, a 2 port valve 290, a MFC (flow controller) 292, a 3 port valve 294 and a 2 port valve 296. A gas stick of the kind illustrated in FIG. 2F is typical of the kind of gas stick used in the semiconductor industry.

Example Two

Figure 3A:
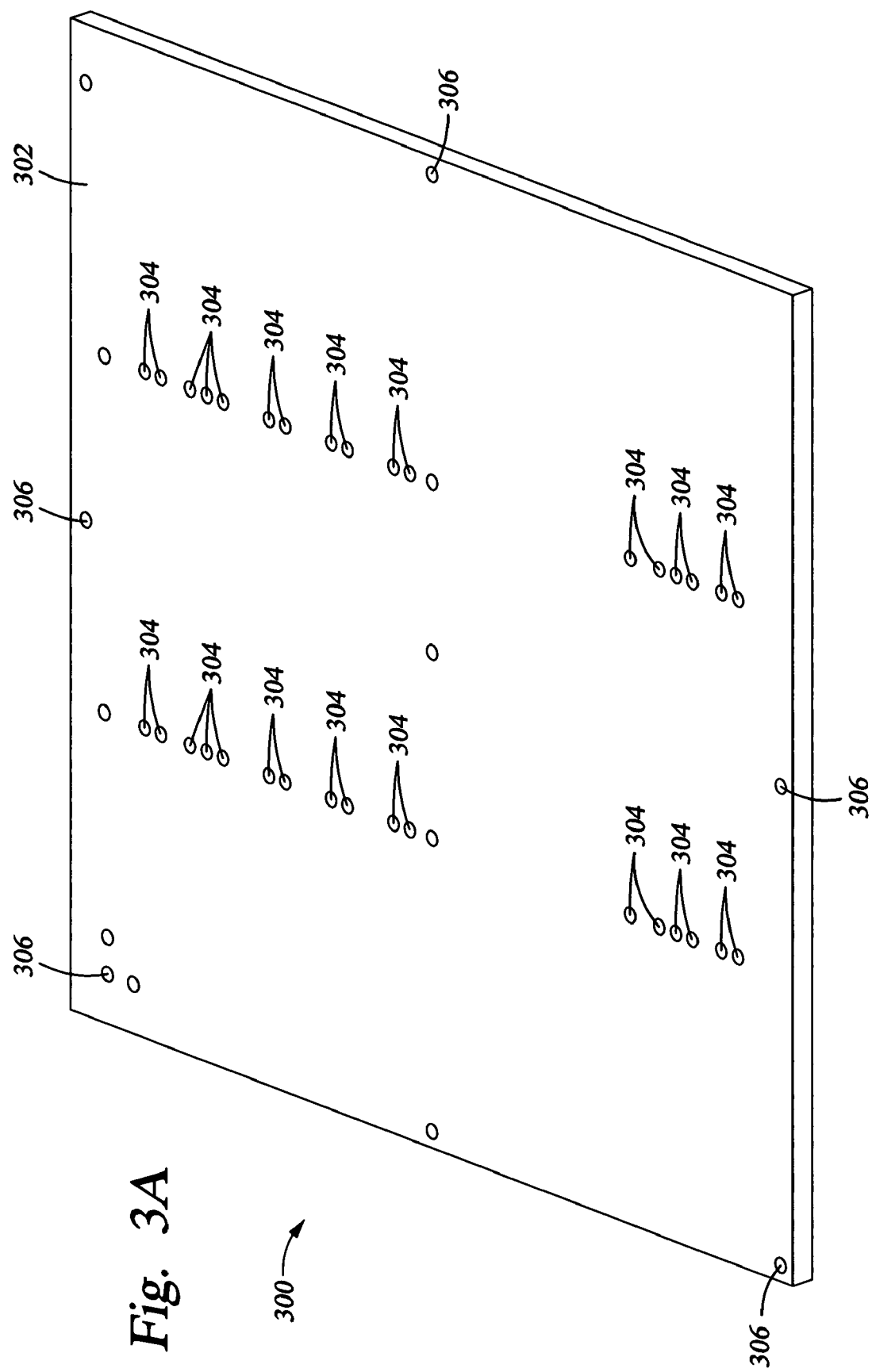
FIG. 3A shows a sheet of material which has been patterned to be the top sheet of material for fabrication of two gas sticks and blank (unmachined regions) where test patterns (coupons) will be generated.

FIG. 3A shows a top sheet 300 for fabrication of diffusion bonded gas sticks and test patterns, where there are two gas sticks laid out on the upper surface 302 of a single top sheet 300. Openings (through holes) 304, which pass entirely through top sheet 300, become part of each finished gas stick (not shown). Openings 306 do not become part of the gas sticks, but are used as reference points for measuring lateral hole displacement that will occur during uniaxial diffusion bonding of the top sheet 300 to the bottom sheet 320 shown in FIG. 3B. Alignment holes are located at 301. These holes are used to mate into pins located on the bottom plate 320 in FIG. 3B. Openings 307 are used for a test pattern for subsequent cross section analysis of the bond profile.

Figure 3B:
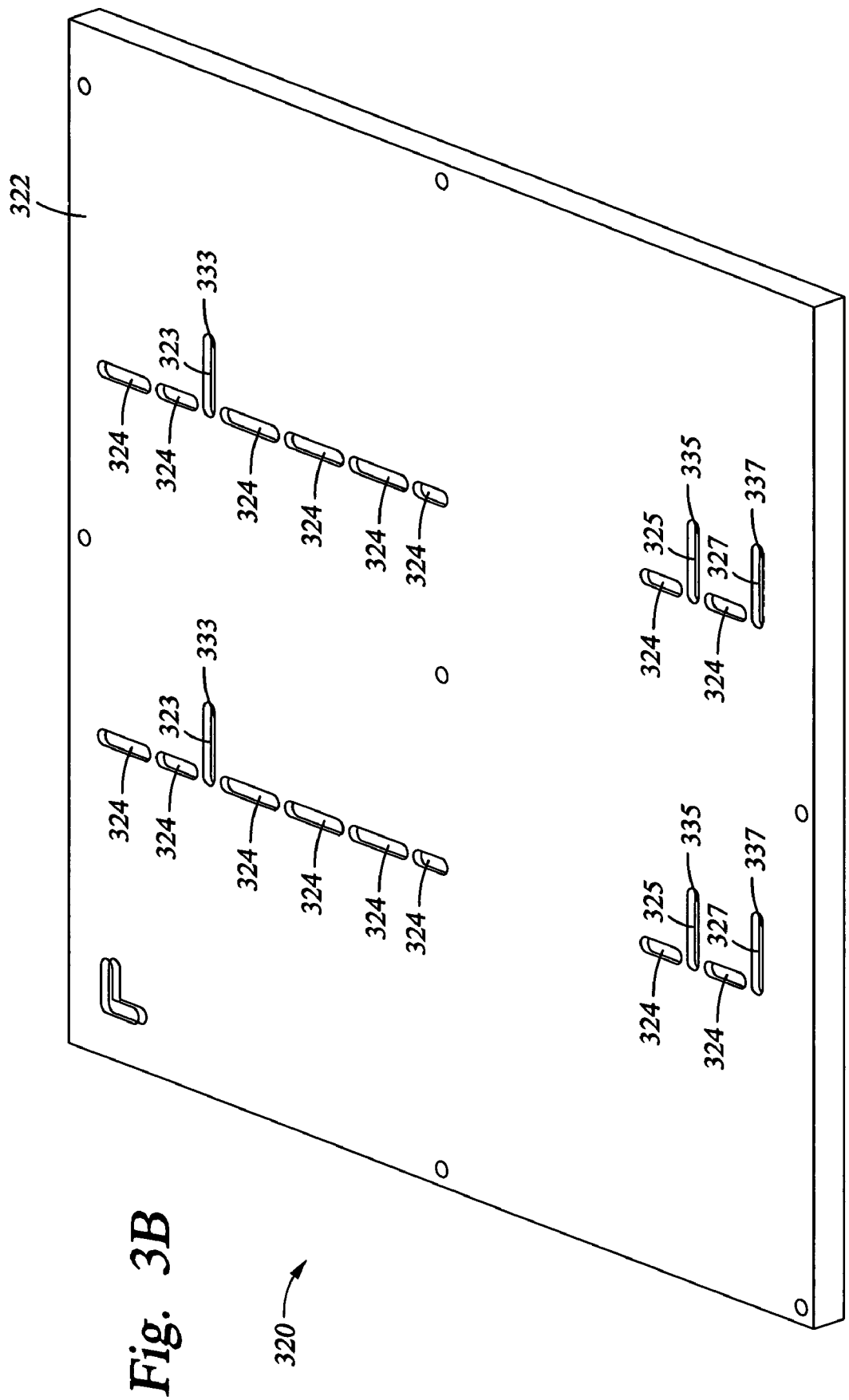
FIG. 3B shows a sheet of material which has been patterned to be the bottom sheet of material for fabrication of two gas sticks, a test pattern in the upper left corner, and blank (unmachined regions) where further test patterns (coupons) will be generated.

FIG. 3B shows a bottom sheet 320 for fabrication of diffusion bonded gas sticks, which corresponds with the top sheet 300 shown in FIG. 3A. Again, there are two gas sticks laid out on the upper surface 322 of the single bottom sheet 320. Machined channels 324 are for use with various devices which will be attached subsequently to a surface of the diffusion bonded gas sticks (not shown). Machined channels 323 and 325 also contain through holes 333 and 335, respectively which are used for providing connection to a purge system or a divert flow system. Machined channel 327 is used to flow gas out of the stick through hole 337. Openings 306 do not become part of the gas sticks, but are used as reference points for measuring lateral hole displacement that will occur during uniaxial diffusion bonding of the top sheet 300 shown in FIG. 3A to the bottom sheet 320 shown in FIG. 3B. Alignment holes are located at 341, where pins are press fit into the holes. The pins are used to align to holes in the top plate 300. Machined channels 328 are used for a test pattern for subsequent cross section analysis of the bond profile.

Figure 3C:
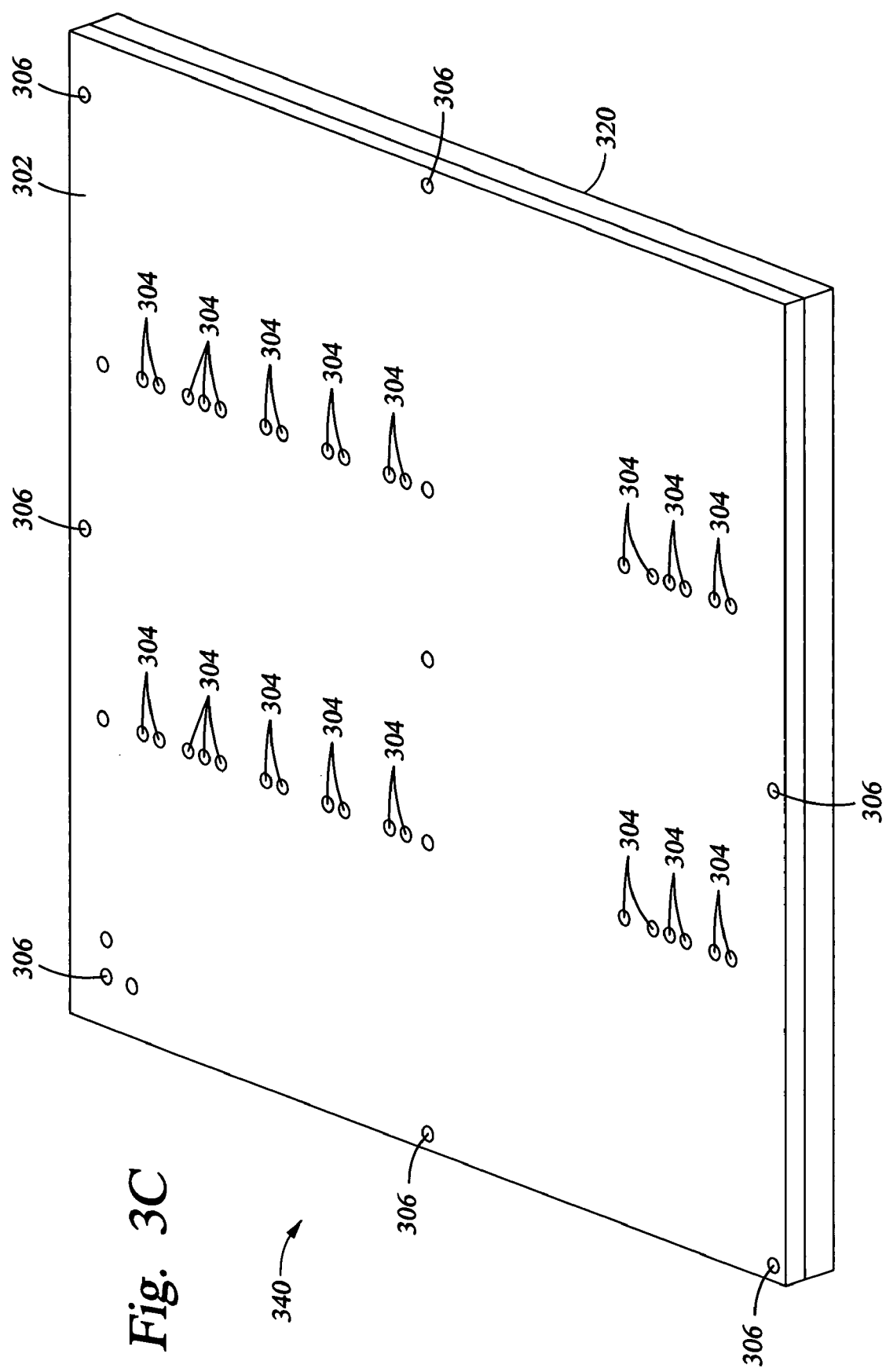
FIG. 3C shows the assembly of the top sheet of material and the bottom sheet of material which are shown in FIGS. 3A and 3B.

FIG. 3C shows an assembly of top sheet 300 and bottom sheet 320 which are to be diffusion bonded to form the initial structure of two gas sticks and some test patterns. The diffusion bonding techniques and the process conditions applied with respect to Example One are repeated for Example Two.

FIG. 3 D shows a diffusion bonded structure 340 comprising top sheet 300 and bottom sheet 320. The bonded structure 340 contains the patterned openings for a first gas stick 342 and a second gas stick 344. The top surface 302 of the bonded structure 340 is further machined to provide a mating surface for a seal which is to be used between through hole openings 304 and a device (not shown) which is surface mounted over openings 306. Counter bores 246 are machined into bonded gas stick structure 340 to permit attachment of devices (not shown) which are surface mounted over openings 304.

Figure 3E:
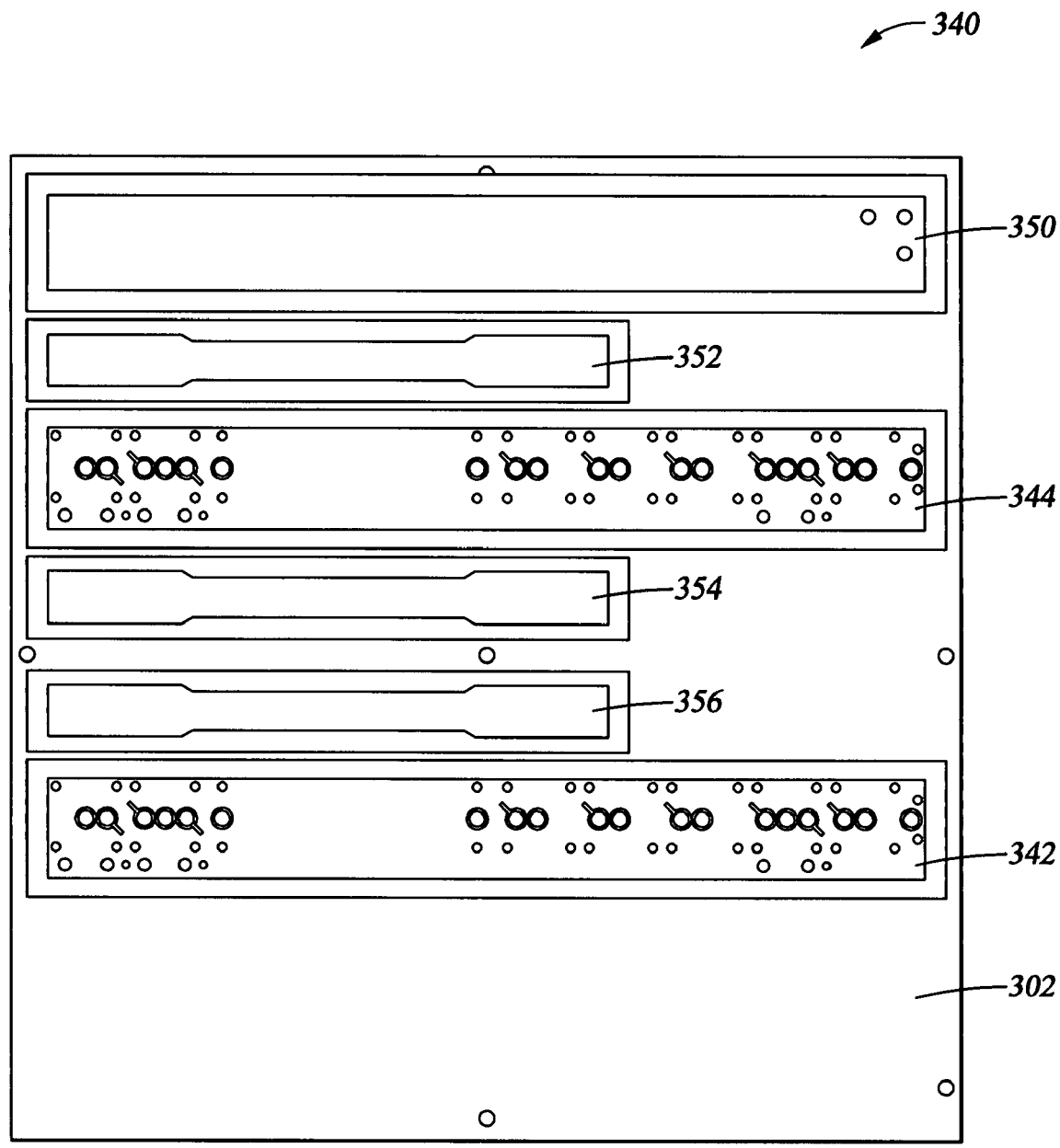
FIG. 3E shows the top view of the diffusion bonded gas stick substrate, with an illustration of the layout of two gas sticks and various test coupons which are to be cut from the diffusion bonded substrate.

FIG. 3E shows the diffusion bonded structure 340 with the gas sticks 342 and 344 laid out on the upper surface 302, along with test coupons 350, 352, 354, and 356. The gas sticks and the test coupons are cut from the single sheet using one milling. The gas sticks are subsequently hydrostatically tested according to ANSI (NFPA) T2.6.1 up to a pressure of about 11,000 psi, and are expected to meet leakage requirements.

Example Three

Figures 4A, 4B:
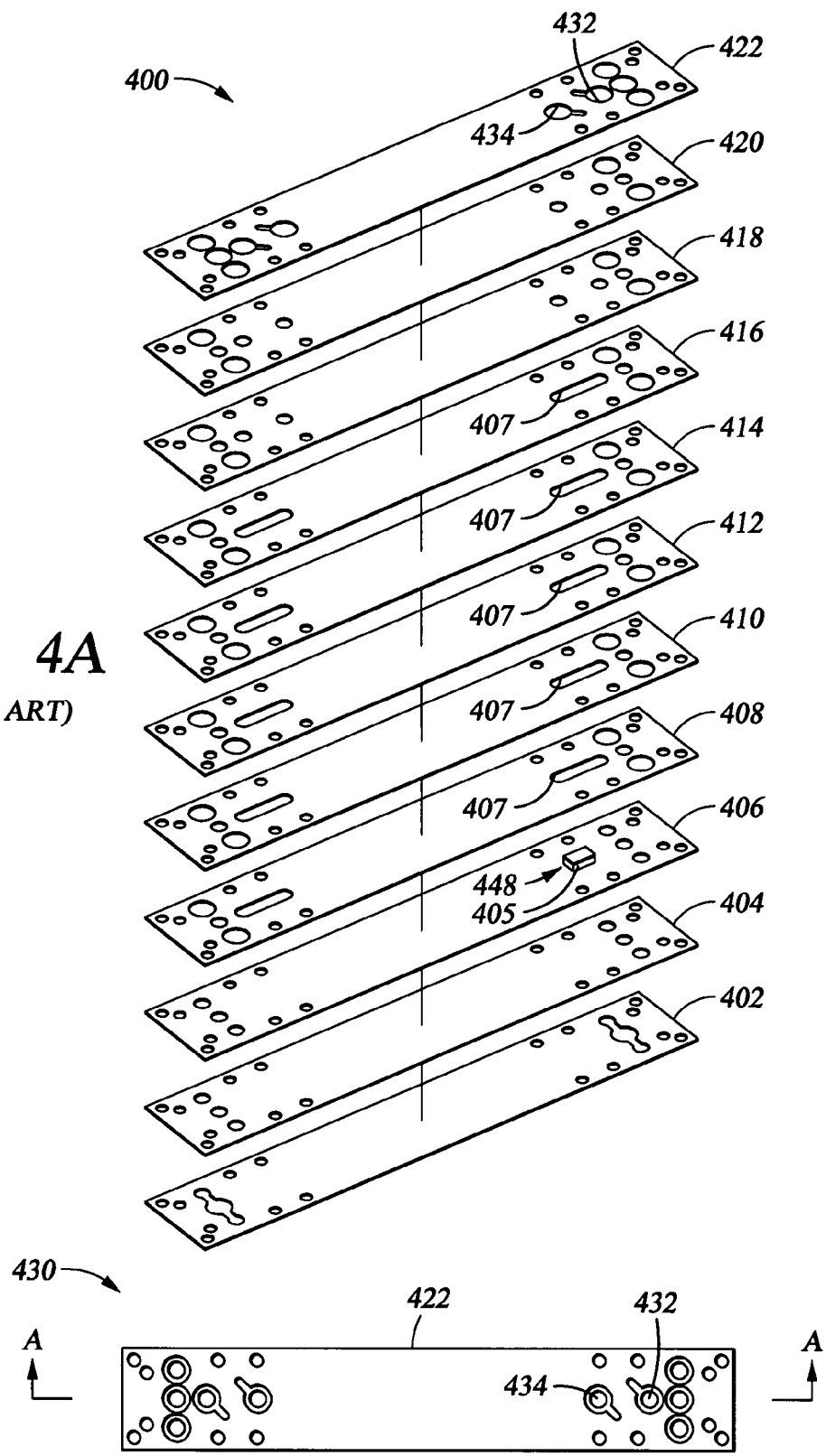
FIG. 4A is a schematic break-away view of a starting structure 400 for forming a layered structure 430 including a fully integratable in-line filter. This structure 400 is taken from prior art assigned to the assignee of the present invention, and is included in the present application to provide a more complete picture of what can be done with the diffusion bonding processing technology described herein.
FIG. 4B is a schematic showing a top view of the layered structure 430 produced from starting structure 400, with cross-sectional marker A-A illustrated thereon.

FIG. 4A is a schematic break-away view of a starting structure 400 for forming a layered substrate 430 which includes a fully integratable in-line filter 450 (shown in FIGS. 4C and 4D). FIG. 4A is used to illustrate how a totally integratable filter can be formed in a space within a fluid flow network, so that the fluid flow will be filtered in line as the fluid passes through the network architecture. The layers 408 through 416 each contain a slot 407 into which a sinterable media 448 will be placed. Typically, sinterable media 448 in a green state is placed in a block or shaped structure 405 on the upper surface of layer 406, so that when all of the layers are compressed, the sinterable media 448 will pass through all of the slots 407 and fill a space made by the slots in the matter shown in FIGS. 4C and 4D.

FIG. 4B is a schematic showing a top view of a diffusion bonded layered substrate 430 showing the top layer 422, fluid entrance 432 and fluid exit 434. FIG. 4B also is marked to show cross-sectional marker A-A.

FIG. 4C is a schematic of the cross-sectional view of layered substrate structure 430. During the diffusion bonding of layered structure 430, the sinterable media 448 has been forced to fill a defined space between fluid entrance 432 and fluid exit 434. The sintered media forms an in-line filter 450 for filtering out particulates which may enter the fluid flow channel 436 of layered structure 430. Layered structure 430 may be part of a larger layered structure (not shown), or component devices (not shown) such as valves may be attached over fluid entrance opening 432 and fluid exit opening 434.

Layers 404 and 420, shown in FIGS. 4C and 4D (which is a more three-dimensional view of cross section A-A) may be fabricated from ELGILOY® to provide a hard sealing surface after the diffusion bonding of structure 430. Other layers in the structure may be series 316 L stainless steel, for example and not by way of limitation. The thickness of an ELGILOY layer may be in the range of 0.004 inches, by way of example and not by way of limitation, compared with the stainless steel layers which are typically in the range of about 0.025 inches, by way of example and not by way of limitation. The composition of ELGILOY is listed in Table 1.

While the design of the inline filter shown in FIGS. 4A through 4D have been taken from related U.S. patent application Ser. No. 10/617,950 of Crockett et al, filed Jul. 12, 2003, the diffusion bonding process conditions which follow are based on work done subsequently, which is the subject matter of the present invention. The diffusion bonding was carried out where the assembly was open to the ambient in the furnace and pressed between two plates. Separator sheets of 316L stainless steel which was electron-beam-coated with yttrium oxide were used between the top and bottom load redistribution plates and the assembly during bonding, to permit ease of removal of the bonded assembly from the stacked graphite load redistribution blocks used during the bonding. The furnace was held at $9.7 \times 10^{-6}$ Torr to $2 \times 10^{-4}$ Torr during diffusion bonding. The pressure applied was 1000 psi. The holding temperature at which the assembly was diffusion bonded ranged between 983° C. and 950° C. A temperature below about 950° C. does not volatilize oxides at the bonding surfaces, and such volatilization is helpful in the bonding process. With respect to the maximum bonding temperature, for 316 L stainless steel, a temperature of above about 985° C. increases grain growth within the sheets being bonded and therefore reduces overall strength of the bonded sheets. Temperature was ramped up from room temperature to 500° C. in 1 hour, at a rate of 8.3° C./min, and from 500° C. to the target temperature at 3.2° C./min. Steady temperature at target ±10±C was held for 4 hours. The cool down rate was initially 10±C per min. and slowed with decreasing temperature. Cooling gas of Argon was available for use to increase the cool down rate.

Example Four

FIGS. 5A-5E show various views of a pressure sensor 500, which is a component device which can be prepared using the chemical etching and diffusion bonding techniques described herein and which can be completely integrated into the gas channel distribution system for a semiconductor apparatus.

Figure 5A:
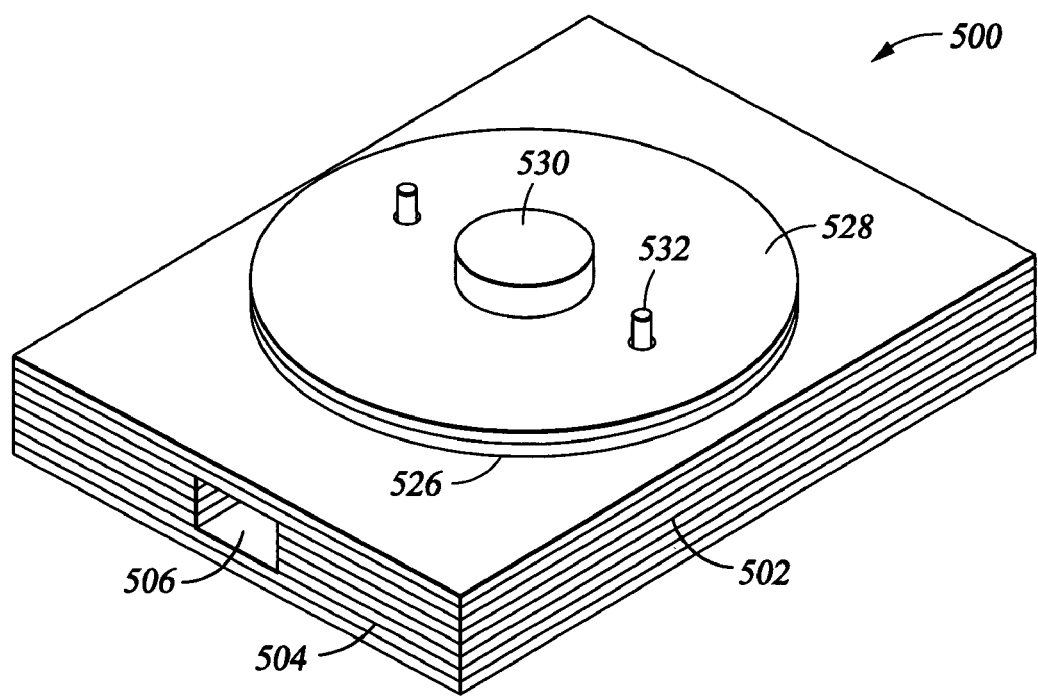
FIG. 5A is a schematic three-dimensional schematic diagram of an integratable multi-layered pressure sensor 500 of the kind which can be fully integrated into a multi-layered fluid handling network architecture.

FIG. 5A shows a schematic three dimensional view of the pressure sensor 500, including closed side 502; fluid entry (or exit) side 504, with opening 506 into which fluids enter or exit; a getter pump 530 at the top of the unit; electrical contact pins 532; cap 528; and a spacer 526, which will be described later with respect to FIG. 5F.

Figure 5B:
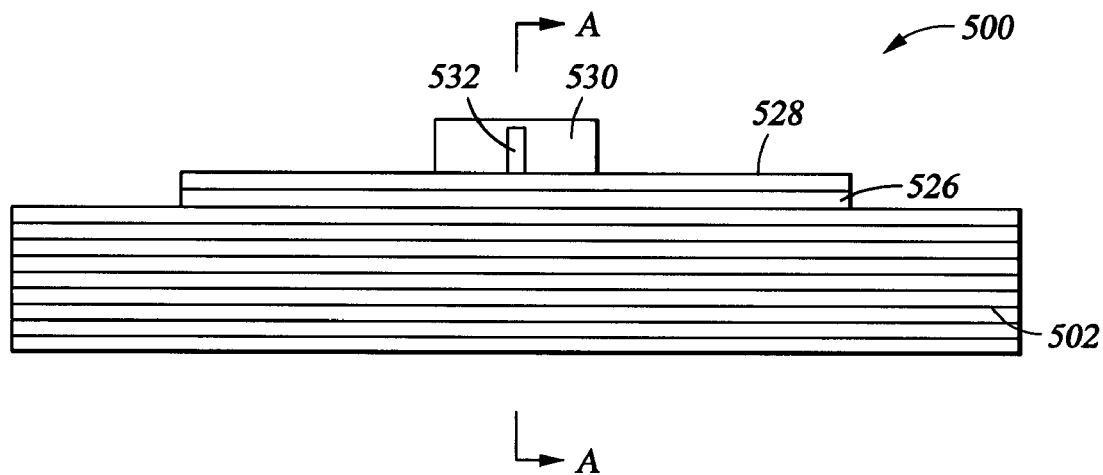
FIG. 5B is a schematic diagram of a side view of side 502 of the pressure sensor 500 shown in FIG. 5A, with a cross-sectioning marker A-A illustrated thereon.

FIG. 5B is a schematic diagram of a side view of closed side 502 of the pressure sensor 500 shown in FIG. 5A, with a cross-sectioning marker A-A illustrated thereon. FIG. 5D is a schematic diagram of the cross-sectional view A-A of the pressure sensor 500 shown in FIG. 5B.

Figure 5C:
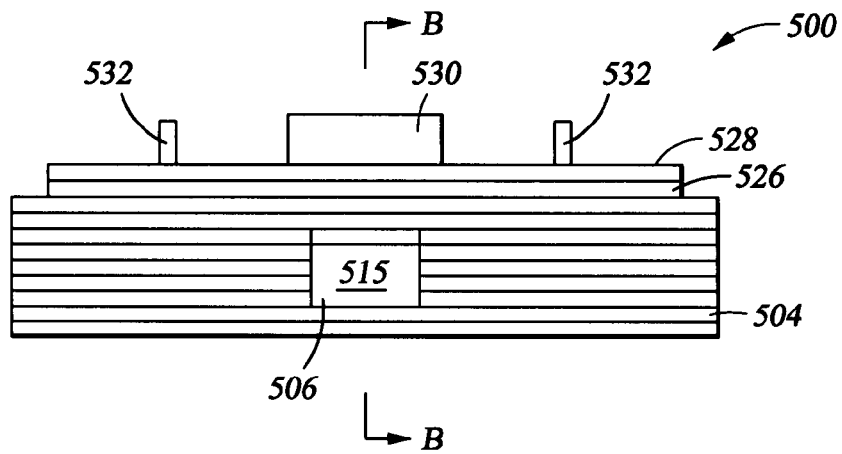
FIG. 5C is a schematic diagram of a side view of side 504 of the pressure sensor 500 shown in FIG. 5A, with a cross-sectioning marker B-B illustrated thereon.
Figure 5D:
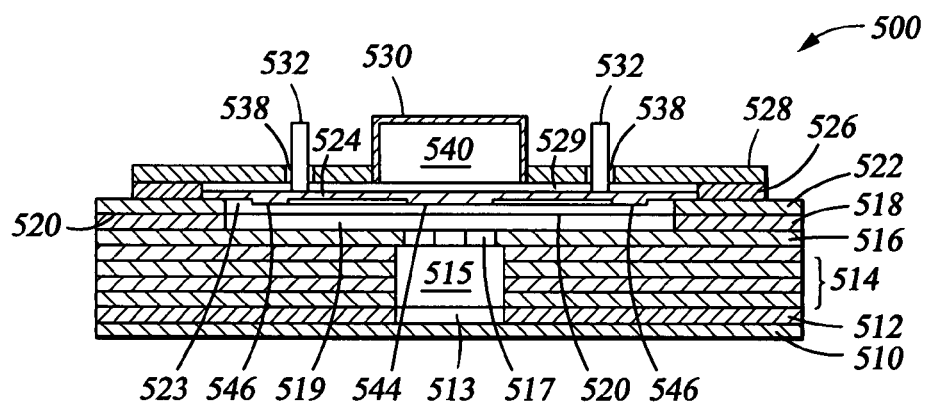
FIG. 5D is a schematic diagram of the cross-sectional view A-A of the pressure sensor 500 shown in FIG. 5B.
Figure 5E:
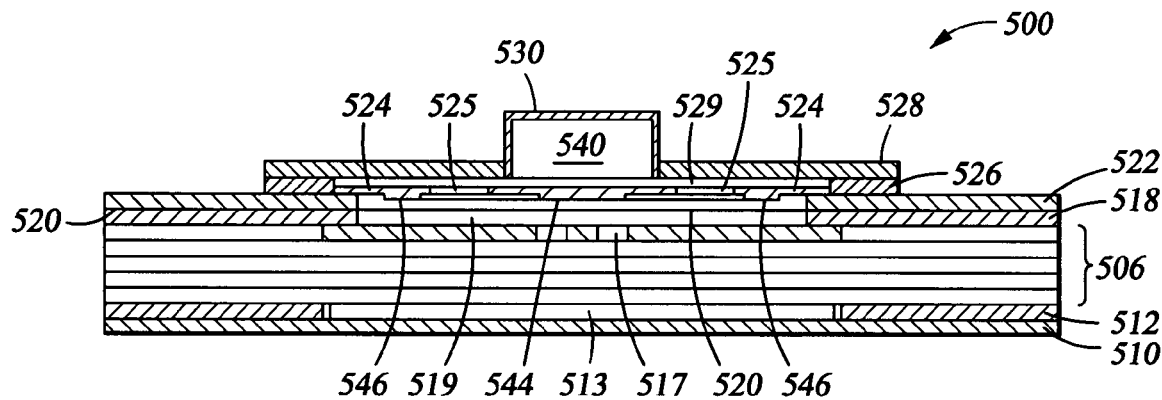
FIG. 5E is a schematic diagram of the cross-sectional view B-B of the pressure sensor 500 shown in FIG. 5C.
Figure 5G:
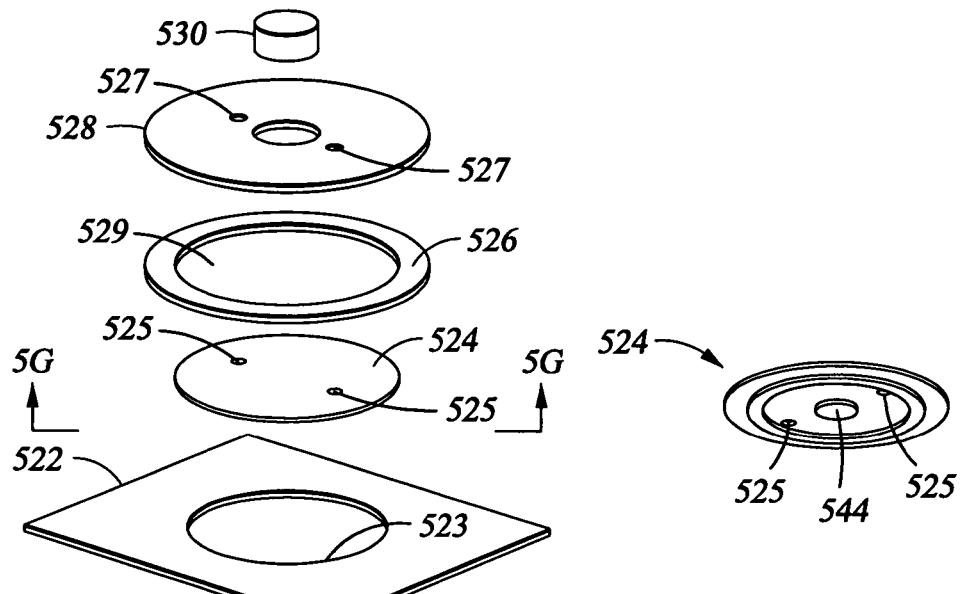
FIG. 5G is an enlarged view of underside 542 of the ceramic disk 524, illustrating the center electrode 544 and the exterior electrode 546.

FIG. 5C is a schematic diagram of a side view of side 504 of the pressure sensor 500 shown in FIG. 5A, which includes entrance (or exit 506) into a channel 515 for fluid flow. FIG. 5E is a schematic diagram of the cross-sectional view B-B of the pressure sensor shown in FIG. 5C.

Figure 5F:
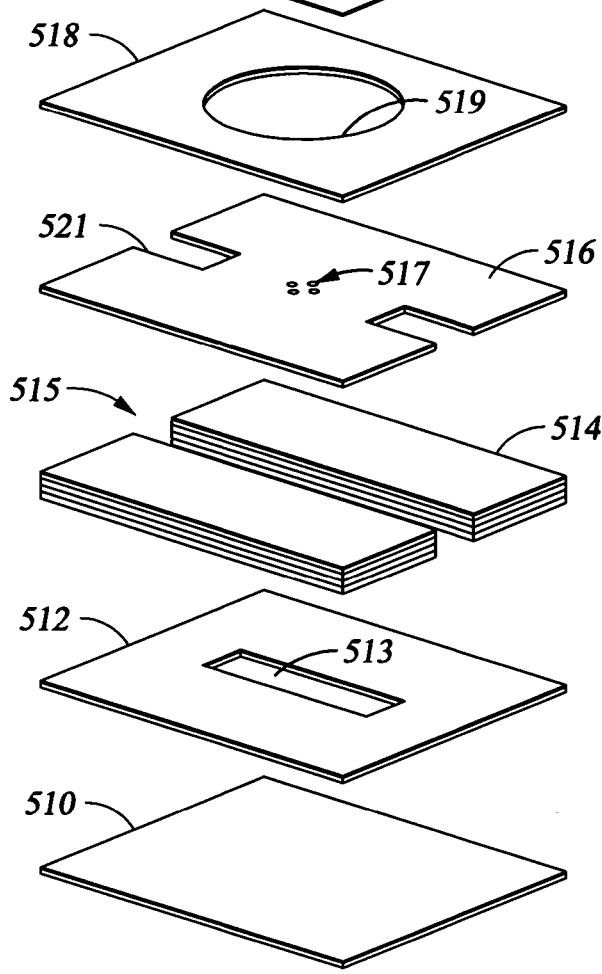
FIG. 5F is an exploded three dimensional view of the pressure sensor 500 shown in FIG. 5A, illustrating the individual component layers which make up the fully integratable pressure sensor.

FIG. 5D, the section A-A view of FIG. 5B, shows in detail the relationship of a portion of the elements of the pressure sensor 500 after diffusion bonding of various layers (which are shown in FIG. 5F) to form a compact, integrated structure. In more detail, FIG. 5D shows the fluid flow channel 515 through which fluids may enter (or exit), where channel 515 is created when patterned openings in an assembly of layers 514, such as those shown in FIG. 5F, are bonded together. Near the exterior base 510 of pressure sensor 500 is a slot 513 which counteracts the effects of volume changes in the fluid flow when only a portion of the fluid volume is directed toward the sensing area. The portion of the fluid flow (not shown) which is sent to the sensing area passes through openings 517 (shown in FIG. 5D) in layer 516 into a first chamber 519 beneath metal diaphragm 520. Openings 517 help to prevent sudden fluid flow fluctuations. Pressure exerted upon metal diaphragm 520 by the fluid deforms metal diaphragm 520 (typically fabricated from a relatively thin (typically about 0.003 inch thick) layer of a material such as ELGILOY®, upward into a second chamber 523 beneath a dielectrically insulating (typically ceramic) disk 524 which has dual electrodes 544 and 546 present on its lower surface, which then passes through (not shown) to the upper surface of disk 524 through openings 525 where they are contacted by electrical contact pins 532. The electrically insulative disk 524 forms part of a capacitor, in combination with metal diaphragm 520 and as diaphragm 520 deforms, changing the spacing between elements in the capacitor, the amount of current passing through the electrodes on the electrically insulative disk 524 changes. This change in electrical current is an indication of a pressure change which can be monitored. Also illustrated in FIG. 5D are layer 512 (which includes slot 513), four fusion-bonded layers which form opening 506 (conduit 515), layer 516 which contains openings 517 which provide fluid contact with diaphragm 520; layer 518 which includes opening/first chamber 519; layer 522 which contains opening/second chamber 523; and spacer 526 which permits formation of a third chamber 529 overlying ceramic disk 524. Getter pump 530 sustains a vacuum in third chamber 529 overlying ceramic disk 524. The vacuum acts as a reference pressure far below sensing pressures, so that changes in pressure are only one side of the diaphragm. Use of the vacuum in the third chamber 529 permits a read out a pre-calibrated absolute pressure rather than a pressure relative to atmospheric pressure.

The pressure sensor could be designed to have the pressure in chamber 529 be substantially higher than the pressure being sensed, in which case the pressure in chamber 529 would cause the diaphragm 520 to deform in a downward direction. Further, no getter pump 530 would be required. The pressure sensor can also be used as a pressure gage, relative to atmospheric pressure if desired for a particular application.

FIG. 5E is a schematic diagram of a side view of side 504 of the pressure sensor 500 shown in FIG. 5A, and is the cross section B-B of FIG. 5C. This view of pressure sensor 500 illustrates openings 525 through which chambers 529 and 523 are connected and held under vacuum.

FIG. 5F is an exploded schematic three dimensional view of the pressure sensor 500 shown in FIG. 5A, illustrating the individual component layers which make up the fully integratable pressure sensor. In particular, bottom layer 510 forms the exterior base of the pressure sensor 500. Layer 512 includes slot 513 which counteracts volume change effects, to reduce the amount of pressure drop when the fluid (not shown) in the sensor 500 passes through openings 517 in layer 516, with excess fluid passing through slots 521. The slots 521 work in combination with 513 to help control volume effects, and therefore pressure effects of the fluid passing through openings 517. Further, slots 521 are typically used to connect to flow channels within a fluid flow network. Layer 518 is used to form a first chamber 519 beneath diaphragm 520 and above openings 517 through which the fluid passes. The fluid in first chamber 519 presses against diaphragm 520 causing a deformation of the portion of the diaphragm 520 which is in contact with second chamber 523 formed within layer 522. An electrically insulating (typically ceramic) disk 524 includes electrical contacts 544 and 546 present on its underside 542 as shown in Figure G. These contacts pass through openings (not shown) in the upper surface of disk 524 to provide contact points for the electrical contact pins 532 shown in FIG. 5D. These contact pins 532 are electrically isolated from the general metallic body of pressure sensor 500 by electrically insulating eyelets 538. The interior of spacer 526 is sufficiently thick to create a third chamber 529 above the surface of disk 524, which is connected to chamber 523 through openings 525. The cap 528 forms the major upper exterior surface of pressure sensor 500 and includes openings 527 through which electrical contact pins 532, insulated by an insulating eyelet, a glass insulator, for example, pass to contact electrical contacts (not shown) on the upper surface of disk 524. A getter pump 530, typically fabricated from titanium, on the upper surface of cap 528 is used to maintain a steady state vacuum in third chamber 529 and in second chamber 523 at a given temperature.

The typical thickness of the metal layers in the multilayered pressure sensor 500 is about 0.025 inches. The majority of the layers are stainless steel (typically series 400 stainless steel). The diaphragm 520 typically has a thickness of about 0.003 inches, and is fabricated from ELGILOY® or a similar nickle/cobalt/chrome alloy which provides a more "spring like" behavior. Electrical contact pins 532 are typically fabricated from copper, and getter pump 530 typically contains a material such as titanium, which soaks up free fluid molecules from third cavity 529 and second cavity 523.

While the design of the inline pressure sensor shown in FIGS. 5A through 5F have been taken from related U.S. patent application Ser. No. 10/617,950 of Crockett et al, filed Jul. 12, 2003, the diffusion bonding process conditions which follow are based on work done subsequently, which is the subject matter of the present invention. The diffusion bonding can be carried out where the assembly may be open to the ambient in the furnace and pressed between two plates. Separator sheets of 316 L stainless steel which was electron-beam-coated with yttrium oxide should be used between the top and bottom load redistribution plates and the assembly during bonding, to permit ease of removal of the bonded assembly from the stacked graphite load redistribution blocks used during the bonding. The furnace should be held at $9.7 \times 10^{-6}$ Torr to $2 \times 10^{-4}$ Torr during diffusion bonding. The pressure applied should be at least 1000 psi. The holding temperature at which the assembly may be diffusion bonded ranges between 980° C. and 950° C. A temperature below about 950° C. does not volatilize oxides at the bonding surfaces, and such volatilization is helpful in the bonding process. With respect to the maximum bonding temperature, for 316 L stainless steel, a temperature above about 985° C. increases grain growth within the sheets being bonded and therefore reduces overall strength of the bonded sheets. The same effect is expected in the present instance. Temperature should be ramped up to about 500° C. over a time period of about 1 hour at a rate of 8.3° C./min, and from 500° C. to the target temperature at a rate of about 3.2° C./min. Steady temperature ±10° C. should be held for 2 to 4 hours. Cool down rate initially should be about 10° C./min and slowed with decreasing temperature. Cooling gas of Argon should be used if available to increase the cool down rate.

With respect to the diffusion bonding of corrosion-resistant metal layers, when each of the metal layers is a 316L series stainless steel, or a majority of the metal layers are 316L series stainless steel in combination with layers of material which bond at a lower diffusion bonding temperature, diffusion bonding is typically performed at a temperature within the range of about 925° C. to about 980° C., at a pressure within the range of about 1,000 psi to about 15,000 psi, for a time period within the range of about 1 hours to about 6 hours. When a combination of 316 L series stainless steel layers and ELGILOY® layers are diffusion bonded, diffusion bonding is performed at a temperature within the range of about 925° C. to about 980° C., at a pressure within the range of about 4000 psi to about 15,000 psi, for a time period within the range of about 2 hours to about 6 hours.

The above-described embodiment is provided to enable one skilled in the art to understand the concepts which are disclosed and claimed herein, and is not intended to limit the scope of the present invention. One skilled in the art, in view of the disclosure in this application may expand the concepts and the materials which may be used for various elements of the layered fluid channels, sensors, actuators, and valves, to correspond with the subject matter of the invention claimed below.

We claim:

1. A method of uniaxially diffusion bonding sheets of stainless steel or stainless steel alloy to form a semiconductor apparatus fluid flow handling structure which is capable of functioning in corrosive environments, said method comprising:

selecting a plurality of sheets to have a chemical composition and structure which will provide an appropriate balance of mechanical strength, chemical compatibility, corrosion resistance and high leak integrity with respect to the fluids which are to flow in the fluid flow handling structure;

pattern etching or pattern machining at least two sheets to produce a depression, or a through hole, or a combination thereof in surfaces of said at least two sheets;

processing bonding surfaces of said at least two sheets to have a surface finish roughness which is less than 10 Ra micro-inches;

processing bonding surfaces to have a cleanliness such that a total ionic contamination of less than 0.33 micrograms per square inch or less is present on said bonding surfaces;

processing said at least two sheets to have a flatness of ±0.001 inches overall and ±0.0005 inches over any 4 square inch area;

processing said at least two sheets to exhibit parallelism of ±0.001 inches overall and ±0.0005 inches over any 4 inch square area in an unrestrained condition;

processing said bonding surfaces of said sheets to remove oxidation, so that an oxidation thickness on said bonding surface ranges from about 40 Angstroms down to about 10 Angstroms;

aligning said plurality of sheets relative to each other in a manner which produces a desired fluid flow handling structure; and subjecting said plurality of sheets to a pressure sufficient to cause a crush ranging between about 0.75% and about 3.0%, as measured when using uni-axial diffusion bonding, while said plurality of sheets are at a temperature ranging from about 900° C. to about 1,000° C., and at a pressure ranging from about 1,000 psi to about 5,000 psi, for a time period ranging from about 2 hours to about 6 hours, to produce a diffusion bond which contains less than 10% void density across an interfacial bonding line between bonding surfaces.

2. A method in accordance with claim 1, wherein said at least two sheets are processed to have a thickness tolerance of about +0.001 inches, unrestrained.

3. A method in accordance with claim 2, wherein said at least two sheets are processed to have a final sheet thickness within 0.003 inches over the desired final thickness.

4. A method in accordance with claim 1, wherein said at least two sheets are processed to have a thickness variation within ±0.0005 inches when stop blocks are used during the application of pressure to achieve diffusion bonding.

5. A method in accordance with claim 1, wherein said surface finish roughness ranges between 0.5 micro-inches Ra and 10 Ra micro-inches Ra.

6. A method in accordance with claim 1, wherein said bonding surfaces of said sheets are processed to remove oxidation, so that an oxidation thickness on said bonding surface ranges from about 40 Angstroms down to about 20 Angstroms.

7. A method in accordance with claim 1, wherein subsequent to said diffusion bonding, an interior surface of a fluid flow conduit within said fluid flow handling system is electropolished, or treated with an ultrasonic-energized slurry, or a combination thereof, whereby said interior surface is made smoother.

8. A method in accordance with claim 1, wherein a plurality of fluid flow handling structures are created during processing of a single assembly of sheets.

9. A method in accordance with claim 1, wherein prior to the alignment and diffusion bonding of said sheets, said sheets are bagged in a sealed bag and stored, awaiting further processing.

10. A method in accordance with claim 9, wherein said sealed bag contains an atmosphere which protects said bagged sheets from corrosion.

11. A method in accordance with claim 1, wherein subsequent to diffusion bonding of said fluid handling structure, said structure is bagged in a sealed bag which protects said structure during shipment and storage prior to use.

* * * * *